United States Patent [19]

Miida et al.

[11] Patent Number: 4,959,726
[45] Date of Patent: Sep. 25, 1990

[54] AUTOMATIC FOCUSING ADJUSTING DEVICE

[75] Inventors: Takashi Miida; Jin Murayama, both of Kanagawa; Kazukiyo Tamada, Tokyo; Takashi Kagechika, Omiya, all of Japan

[73] Assignee: Fuji Photo Film Co., Ltd., Kamagawa, Japan

[21] Appl. No.: 321,289

[22] Filed: Mar. 9, 1989

[30] Foreign Application Priority Data

Mar. 10, 1988 [JP] Japan .................................. 6356874
Mar. 10, 1988 [JP] Japan .................................. 6356875

[51] Int. Cl.$^5$ .............................................. B03B 3/00
[52] U.S. Cl. ................................. 358/227; 354/402; 354/404; 250/201.4
[58] Field of Search ................ 358/227; 354/400, 402, 354/404, 403; 250/201.2, 201.4, 201.8, 201

[56] References Cited

U.S. PATENT DOCUMENTS

| | | | |
|---|---|---|---|
| 4,522,492 | 6/1985 | Masunaga | 354/402 |
| 4,623,237 | 11/1986 | Kameda et al. | 358/227 |
| 4,636,624 | 1/1987 | Ishida et al. | 250/201 |
| 4,849,619 | 7/1989 | Miida et al. | 250/201 |
| 4,878,079 | 10/1989 | Hamada et al. | 354/402 |

Primary Examiner—Joseph A. Orsino
Assistant Examiner—Jill Jackson

[57] ABSTRACT

An automatic focusing adjusting device for use in a camera is disclosed in which an operation processing on the phase difference detection to be executed when the focusing of an image pickup optical system is detected can be performed by means of an analog signal processing. In the automatic focusing adjusting device, when the distance measurement ranges in a light receiving part of sensor means are specified by operation means, then control means controls charge input preventive means in such a manner that only the signal electric charges that are stored in photoelectric conversion elements forming the light receiving part but belonging to the other distance measurement ranges that the ranges specified by the operation means are prevented from flowing into a readout part in the sensor means, whereby the distance measurement ranges in the light receiving part of the sensor means can be changed. Also, in the adjusting device, based on the output signal of the operation means or on the distance measurement information obtained from the sensor means, the distance measurement ranges in the light receiving part of the sensor means can be changed and the changed versions of the distance measurement ranges can be visibly displayed on display means.

14 Claims, 17 Drawing Sheets

AUTOMATIC FOCUSING ADJUSTING DEVICE

BACKGROUND OF THE INVENTION

1. Field of the Invention

The present invention relates to an automatic focusing adjusting device for use in an optical instrument such as a camera or the like and, in particular, to an automatic focusing adjusting device ideal for use in a camera which is capable of performing an operational processing on the phase difference detection to be executed when the focusing of an image pickup optical system is detected, by means of an analog signal processing.

2. Description of the Related Art

Conventionally, an automatic focusing detecting device, which is used in an automatic focusing adjusting device for use in an optical instrument such as a camera or the like, has such structure as shown in FIG. 17. In this structure, a taking lens 1 is disposed in the left-most position, that is, upstream in FIG. 17. Downstream of the taking lens 1, there are arranged an image pickup equivalent surface 2, a condenser lens 3, a separator lens 4, and a phase difference detecting device in this order.

The phase difference detecting device comprises two line sensors 5, 6 which are adapted to receive a pair of object image to be focused by the separator lens 4 and to convert the light images into electric signals, and a process circuit 7 which checks focusing conditions based on the electric signals that are generated according to the distributions of the light intensity in the respective pixels of the line sensors 5, 6.

The images focused on the line sensors 5, 6 are closer to an optical axis 8 in a forwardly focused state in which the image of the object is positioned forwardly of the image pickup equivalent surface 2, are farther from the optical axis 8 in a rearwardly focused state, and are situated at a predetermined position midway between the forwardly and rearwardly focused states in a focused state. For this reason, the process circuit 7 checks for the focused state by detecting the position of the focused image with respect to the optical axis 8 in accordance with the electric signals (distance measurement information) that are generated from the line sensors 5 and 6, respectively. Conventionally, in order to detect the position of the images focused on the line sensors 5 and 6, a phase difference detection method is used. According to this method, an operation is carried out based on the following equation (1) to find the correlation operation values of a pair of focused images on the line sensors 5 and 6, such operation is continued until the smallest correlation value is found, and the focused state is checked based on an amount of relative movement (a phase difference) of the positions of the focused images with respect to the position of the focused images in focus.

$$H(l) = \sum_{K=1}^{n} |B(k) - R(k + l - 1)| \quad (1)$$

where, l is an integral number 1 through 9 and represents the above-mentioned amount of relative movement.

Also, when l=1, no shift operation is performed, and when l≧2, the shift operation can be carried out.

Here, B(K) represents electrical signals which are output in a time series manner from the respective pixels of the line sensor 5, and R (K+l−1) expresses electrical signals which are output in a time series manner from the respective pixels of the line sensor 6. Thus, if the above-mentioned equation (1) is operated each time 1 is caused to vary from 1 to 9, then the correlation operation values H(1), H(2), ... H(9) can be obtained. For example, it is previously set that the images focused on the line sensors are in the focused state when the correlation operation value H(5) becomes the smallest value. Then, if any correlation operation value at a position shifted from the correlation operation value H(5) becomes the smallest value, then the amount of such shifting, that is, the phase difference to l=5 can be detected as the amount of out-of-focus (the amount of de-focusing).

Now, in FIG. 18, there is shown the structure of the conventional process circuit 7. In this structure, the analog electric signals B(K), R(K) that are generated by the respective pixels of the line sensors 5, 6 are converted by an A/D converter 9 into digital data of, for example, 8 bits, and the digital data are once stored through a microcomputer 10 into a RAM (Random Access Memory). After then, the above-mentioned equation is operated based on these digital data.

By the way, in the automatic focusing adjusting device, if the number of pixels of a line sensor (which is referred to as a range of distance measurement) that are used to detect focusing (that is, to measure distances) is constant, then the following problems arise. In other words, for example, when photographing by use of a camera, if the distance measurement range of the line sensor is too wide, then various objects existing in far and near places are output from the line sensor as the distance measurement information, with the result that the object to be essentially distance measured cannot be selected. On the other hand, if the distance measurement range is too narrow, then, for example, when taking a picture of the face of a character in a close-up manner by means of telephotography, there is produced a monotonous picture in which no light or shade can be seen in the various parts of the character's face.

Also, in a plurality of optical instruments such as cameras or the like which have different image pickup optical systems and different screen sizes from one another, if the distance measurement range of the line sensor is constant, then a ratio of are to be occupied by the line sensor in the screen is cause to vary to a great extent, so that similar problems as in the above mentioned case will arise.

In view of this, in the conventional automatic focusing adjusting device, in order to vary the distance measurement range of the line sensor according to the objects to be photographed, the photoelectric conversion element of the line sensor belonging to the distance measurement range is addressed by use of control means and is then activated. However, this results in the increased loads of the software and thus the cost of the automatic focusing adjusting device is increased, which provides a big problem to be solved.

SUMMARY OF THE INVENTION

The present invention aims at eliminating the drawbacks found in the above-mentioned conventional automatic focusing adjusting devices.

Accordingly, it is an object of the invention to provide an automatic focusing adjusting device which is capable of freely changing the distance measurement range of a line sensor on the side of the line sensor.

In order to attain the above object, according to the invention, there is provided an automatic focusing adjusting device which checks whether an image pickup optical system is in a focused state of not by detecting the relative positions of a pair of optical images of an object to be photographed as the distance measurement information, and, when the image pickup optical system is not in the focused state, drives the image pickup optical system in the direction of the optical axis thereof based on the above-mentioned relative positions until the image pickup optical system gets into the focused state so as to achieve focusing, the automatic focusing adjusting device comprising: sensor means including a pair of sensors each having a light receiving part consisting of a plurality of photoelectric conversion elements arranged in a line manner each photoelectric conversion element forming a pixel, a storage part for storing the signal charges that are generated in the light receiving part for every pixel, a readout part for reading out the signal charges that are transferred from the storage part, and charge input preventive means for preventing the signal charges that are generated in the respective photoelectric conversion elements forming the light receiving part from flowing into the readout part, the sensor means being capable of photoelectrically converting the pair of optical images by means of the pair of sensors and of outputting in a non-destructive manner the analog electric signal that is generated by the photoelectric conversion and corresponds to one of the paired optical images and the analog electric signal that is generated by the photoelectric conversion and corresponds to the other of the paired optical images while staggering the analog electric signals from each other at a given cycle for every pixel; operation means for specifying a distance measurement range in each of the light receiving parts of the sensor means; and, control means responsive to the specification by the operation means for controlling the charge input preventive means so that only the signal charges that are stored in the photoelectric conversion elements but belong to the distance measurement range unnecessary for the distance measurement information in the light receiving part are prevented from flowing into the readout part.

In the automatic focusing adjusting device according to the invention, when the distance measurement range in the light receiving part of the sensor means is specified by the operation means, then the control means controls the charge input preventive means such that only the signal charges stored in the photoelectric conversion elements of the light receiving part belonging to other ranges than the distance measurement range specified by the operation means are prevented from flowing into the readout part of the sensor means.

As the charge input preventive means, there are available a group of lateral overflow gates, a group of lateral over drains, a group of transfer gates, a group of clear gates, and a drain. By supplying a predetermined level of voltage for the above mentioned respective gates formed so as to correspond to the respective photoelectric conversion elements constituting the light receiving part, the signal charges that are stored in the photoelectric conversion elements belonging to other ranges than the distance measurement range in the light receiving part are sure to be prevented from flowing into the readout part of the sensor means to thereby determine the distance measurement range.

Alternatively, instead of using the control means, it is possible to supply the charge input preventive means the voltage for determination of the distance measurement range only b operating a manual switch.

On the other hang, when the distance measurement range of the line sensor is changed, it is convenient for an operator if the changed version of the distance measurement range can be displayed visibly.

In view of this, it is another object of the invention to provide an automatic focusing adjusting device which is capable of visibly displaying the distance measurement range of a line sensor.

In order to achieve this object, according to the invention, there is provide an automatic focusing adjusting device which checks whether an image pickup optical system is in a focused state or not by detecting the relative positions of a pair of optical images of an object to be photographed as the distance measurement information, and, when the image pickup optical system is not in the focused state, drives the image pickup optical system in the direction of the optical axis thereof based on the above-mentioned relative positions until the image pickup optical system gets into the focused state so as to achieve focusing, the automatic focusing adjusting device comprising: sensor means including a pair of sensors each consisting of a plurality of photoelectric conversion elements arranged in a line manner, each element forming a pixel, the sensor means being capable of detecting the relative positions of the paired optical images respectively formed on the paired sensors as the distance measurement information on the object; operation means for specifying the distance measurement range of the paired sensors; display means for visibly displaying the distance measurement ranges of the paired sensors; and, control means for changing the distance measurement ranges of the paired sensors based on the distance measurement information that is obtained from the sensor means or based on the output signal of the operation means and for allowing the display means to display the changed versions of the distance measurement ranges.

In the automatic focusing adjusting device according to the invention, if the distance measurement range of the paired sensors constituting the sensor means is specified by the operation means, then the distance measurement range of the paired sensors is changed based on the output signal of the operation means and the changed version of the distance measurement range of the paired sensors is visibly displayed by the display means.

Also, in accordance with the distance measurement information that is obtained from the sensor means, the distance measurement range of the paired sensors is changed by the control means and similarly the changed version of the distance measurement range is visibly displayed on the display means.

BRIEF DESCRIPTION OF THE DRAWINGS

The exact nature of this invention, as well as other object and advantages thereof, will be readily apparent from consideration of the following specification relating to the accompanying drawings, in which like reference characters designate the same of similar parts throughout the figures thereof and wherein:

FIG. 15 is a timing chart to illustrate the operation of the circuit employed in FIG. 14;

DETAILED DESCRIPTION OF THE INVENTION

Detailed description will here under be given of the preferred embodiments of an automatic focusing adjusting device according to the present invention with reference to the accompanying drawings.

Figure 1:
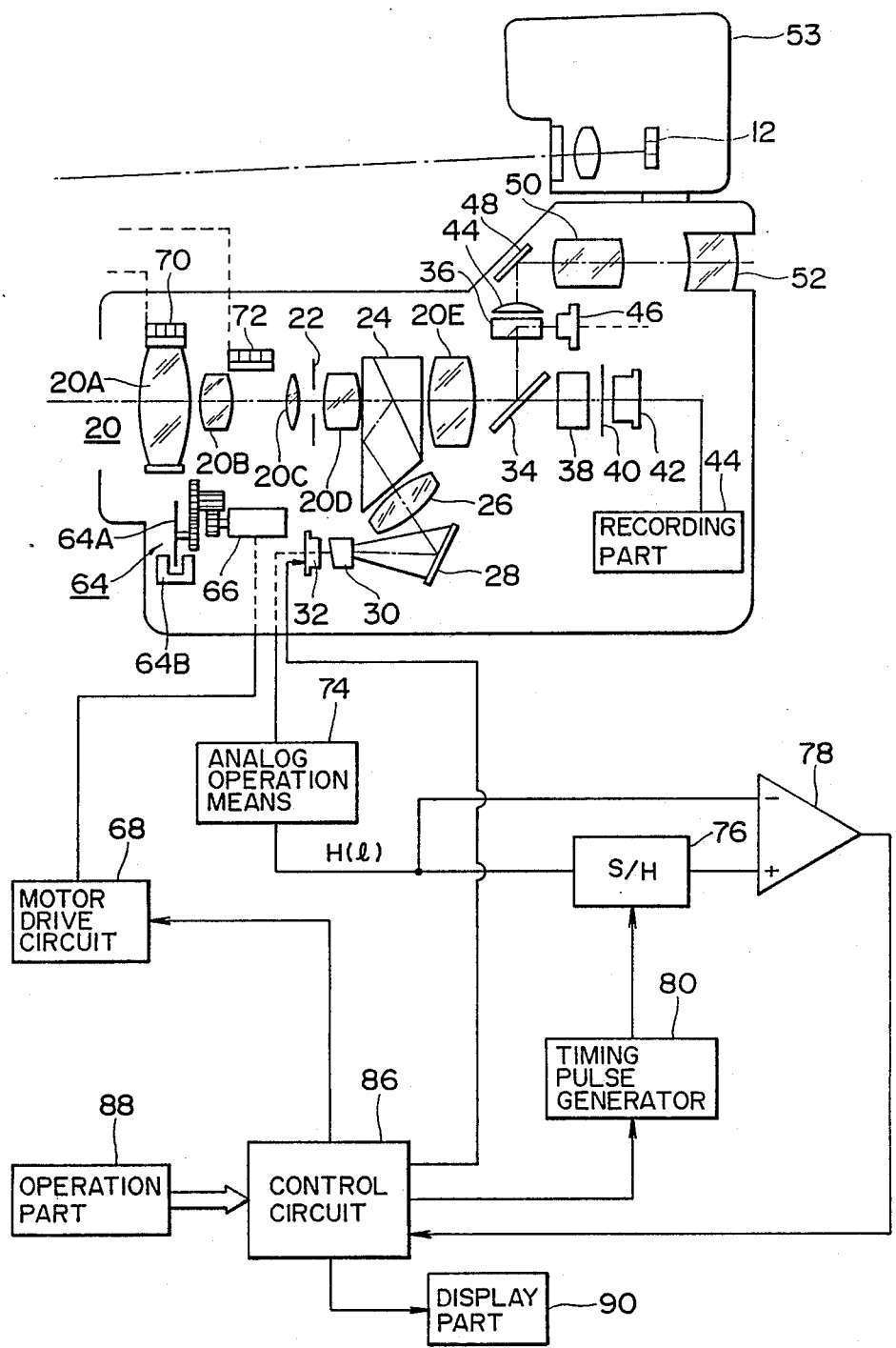
FIG. 1 a block diagram of the structure of an embodiment of a camera which is provided with an automatic focusing adjusting device according to the invention.

Referring first to FIG. 1, there is shown the structure of an embodiment of a camera which is provided with an automatic focusing adjusting device according to the present invention. In this figure, a zoom lens which is designated by 20, comprises a focus lens group 20A which is used to form an image of an object of a focal plane, a varying lens group 20B which is used to vary a focal length, a compensator lens group 20C used to compensate the shift of a focus that is caused by the movement of the local length, and master lens groups 20D, 20E. Between the compensator lens group 20C and the master lens group 20D there is interposed a stop diaphragm 22. Also, between the master lens groups 20D and 20E, there is interposed a beam splitter 24.

The focus lens group 20A is held by a first inner cylinder (which is not shown) and is also arranged so as to extend into a first outer cylinder. Thus, by rotating the first outer cylinder, the focus lens group 20A can be moved in the direction of an optical axis. The outer cylinder can be rotated by a DC motor 66. In turn, the DC motor 66 can be rotationally driven by a drive signal which is output from a motor drive circuit 38 The absolute position of the focus lens group 20A, which is moved to a predetermined position with the rotational movement of the first outer cylinder, can be determined by means of the position data in the form of a grey code that is output from a focus lens position detection part 70 provided in the first outer cylinder. The position data in the form of a grey code is created by a pattern electrode which is formed in the focus lens position detection part 70, and the data that represents the position of movement of the focus lens group 20A is output to a control circuit 86.

The control circuit 86 is composed of a microcomputer and the like and is capable of performing various control operations on the respective parts of the camera including a focus control operation. However, in this embodiment, since other controls than the focus control by the control circuit 86 are not connected directly with the subject matter of the present invention, the description thereof will be omitted.

Now, the DC motor 66 has a shaft of rotation which is connected through a gear mechanism with the first outer cylinder and the first outer cylinder can be rotated by the DC motor 66. The amount of rotation of the first outer cylinder can be detected by an encoder 64 which comprises a disc 64A formed with a large number of radially arranged slits and a photo-interrupter 64B.

The amount of movement of the focus lens group 20A may be detected by connecting it with the amount of rotation of the DC motor 66 which can be detected by a detector adapted to count the number of the slits in the disc.

The varying lens group 20B and compensator lens group C are both held by a second inner cylinder (which is not shown) and also are arranged so as to extend into a second outer cylinder. The second outer cylinder is formed in the inside thereof with a cam groove in which there is positioned a pin that is provides on and projected out from the outside of second inner cylinder. The magnification of the zoom lens is caused to vary as the second outer cylinder is rotated, while the image of the object is always formed on the light receiving surface of a CCD 42 for image pickup. The magnification of the zoom lens can be examined according to the zoom information in this embodiment, the focal length fz of the zoom lens) if a grey code that is output from a zoom lens detect part 72 provided in the second outer cylinder. The zoom information output from the zoom lens detect part 72 is input to the control circuit 86.

The light that has passed through the stop diaphragm is divided by the beam splitter 24 into two optical systems, that is, an image pickup optical system and an AF (Auto Focus) system.

Figure 17:
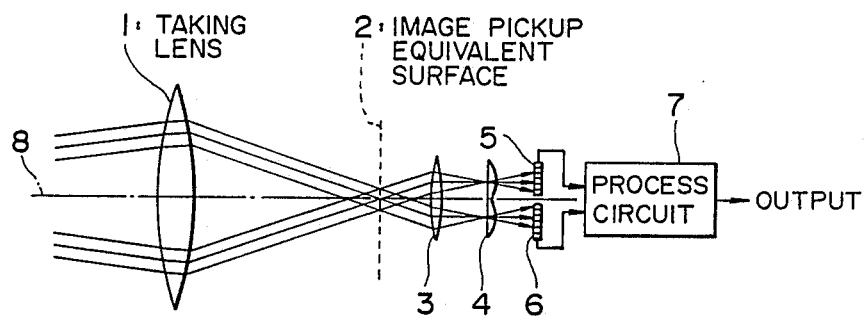
FIG. 17 is a general view of the structure of an automatic focusing detecting device according to the prior art; and, FIG. 18 is a block diagram of the structure of a phase difference detecting device employed in FIG. 17.
Figure 18:
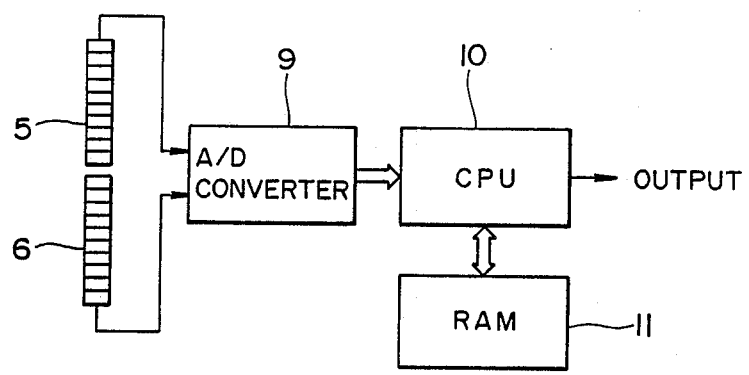

The light that is divided by the beam splitter 24 is passed through a lens 26 for AF, a reflector 28 and a sensor optical system 30 and is received by sensor means 32. The sensor optical system 30 is composed of a condenser lens 3, a separator lens 4 and the like which are shown in FIG. 17.

The stop diaphragm 22 has an opening which can be adjusted by a serve motor (not shown) to be driven and controlled by the control circuit 86.

The light that has passed through the zoom lens is reflected upwardly by 90° by a reflector 34 and is thus guided to enter a beam splitter 36. When photographing, the reflector 34 jumps upward, so that the image of the incident light can be formed of the light receiving surface of the CCD 42 for image pickup. On the light receiving surface of the CCD 42 there are stored the electric charges that correspond to the image of the object and thus the electric signals that correspond to the patterns of the electric charges are output to a recording part 44.

There is provided a low-pass filter 38 which is used to remove the unnecessary components of the incident light to thereby prevent the generation of interference fringes. There is also arranged a shutter 42 which is used to control the light receiving time of the CCD 42. The recording part 44 is arranged so that it can create, based on an input signal, a video signal which represents the image of the object and record the video signal into a recording medium such as a magnetic disc or the like.

The light that has entered the beam splitter 36 is guided, as it is, through an image forming lens 44 to a finder optical system and part of the light of the beam splitter 36 is received by a light receiving element 46.

An electric signal, which has been converted photoelectrically by the light receiving element 46, is input to the control circuit 86 and, responsive to the input signal, the control circuit 86 controls the stop value of the stop diaphragm 22 and the speed of the shutter 40.

The above-mentioned finder optical system comprises a reflector 48, a relay lens 50 and an eyepiece 52.

On the top portion of the main body of the camera there is provided a strobe-lite 53 and also within a main body of the strobe-lite 53 there is arranged a light emitting element 12 which can be used as an auxiliary light when the brightness of the field light is short in adjusting the automatic focusing.

The control circuit 86 is a circuit which is arranged so as to generally control the main body of the camera and, to the control circuit 86, there are connected an operation part 88 which includes a power supply switch, a shutter release button, a switch for specifying the distance measurement range of a pair of sensors forming the sensor means 32 and other similar operation members, and a display part 90 which is used to display the distance measurement range of the paired sensors forming the sensor means 32. In the present embodiment, the display part 90 is formed of a liquid crystal display member which is disposed within an optical finder. However, this is not always limitative, but an electronic view finder (EVF) may be used instead to display the distance measurement range.

Now, the photoelectrically converted, analog electric signal that is output from the sensor means 32 is input to an analog operation means 74 and then a correlation operation is performed by the analog operation means 74. The structures of the sensor means 32 and analog operation means 74 are shown respectively in FIG. 2. In this figure, the sensor means 32 comprises a reference image sensor 320, a standard image sensor 321, a reference readout part 322 and a standard readout part 323. The reference image sensor 320 and standard image sensor 321 correspond to the line sensors 5 and 6 which are shown in FIG. 17, respectively. Each of the image sensors 320 and 321 includes a CCD (a charge coupled device) which is adapted to transfer a signal charge generated in every pixel by means of a plurality of electric charge transfer elements.

Also, the reference and standard readout parts 322 and 323 are respectively arranged so as to output at a given timing add in a time series manner the analog signals (which is hereinafter referred to as pixel signals) relating to the image of the object that have been obtained by the photoelectric conversion by the respective image sensors 320 and 321.

The above-mentioned analog operation part 74 comprises an analog operation part 740, a control signal generation part 742 and an AGC circuit 744.

The analog operation part 740 performs an operation on the phase difference detection in accordance with the pixel signals $R(K)$, $B(K)$ that are output respectively from the reference and standard readout parts 322 and 323 in such a manner that they are staggered for every pixel, and outputs the operation results thereof to an output terminal 745.

The control signal generation part 742 generates various kinds of control signals which are used to control the operation timings of the whole device, including an electric charge transfer clock signal for allowing the above-mentioned CCDs within the image sensors 320, 321 to perform their transfer operations a control signal for instructing the readout parts 322 and 323 to output the pixel signals $R(K)$ and $B(K)$ respectively at a given timing which is synchronized with the electric charge transfer clock signal, and other control signals.

The AGC circuit 744 detects the signal charges that are generated for the respective pixels of the two image sensors 320 and 321 and, when it detects that the amount of the electric charges reaches a given level, the AGC circuit 744 instructs the control signal generation part 742 to the effect that the phase difference detection operation is to be started.

Figure 2:
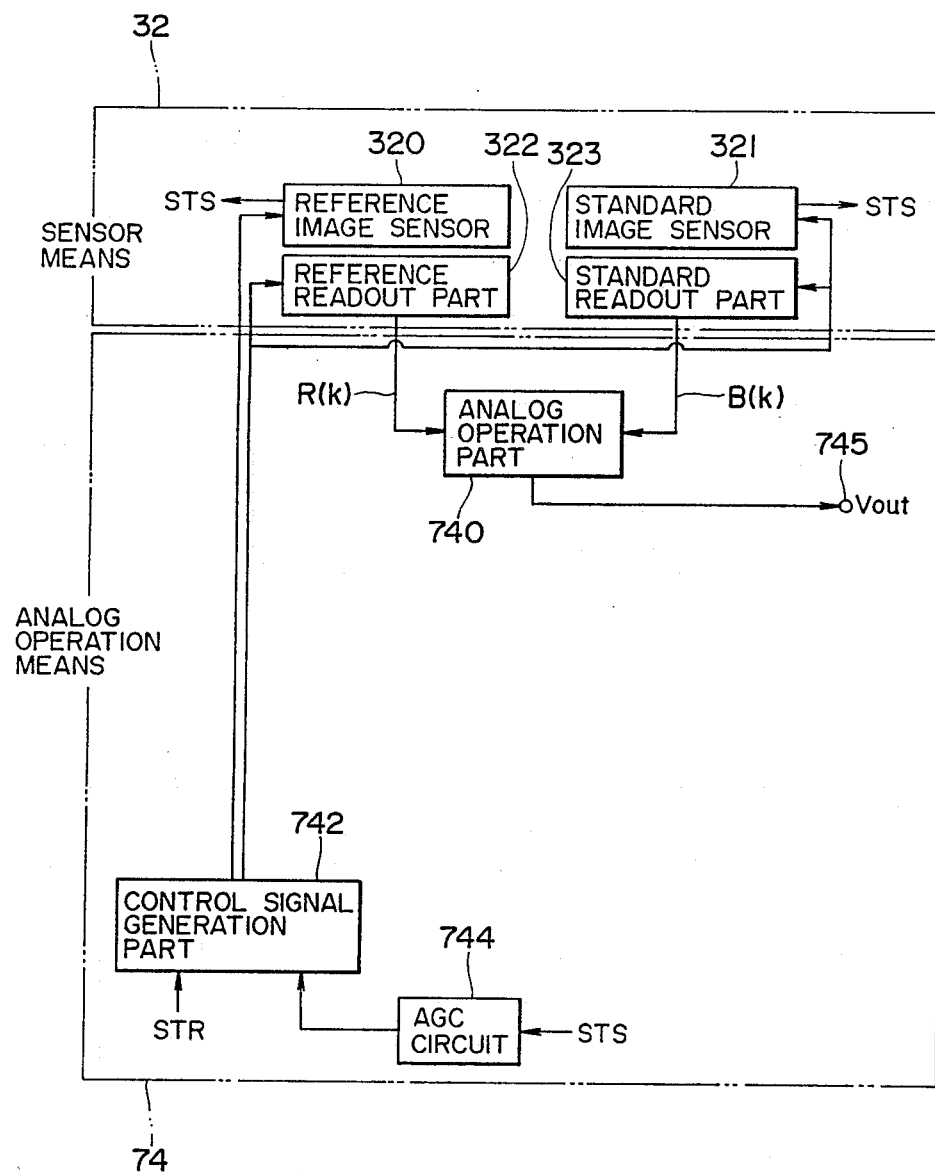
FIG. 2 is a block diagram of the structure of an embodiment of a phase difference detection device employed in the camera shown in FIG. 1.
Figure 3:
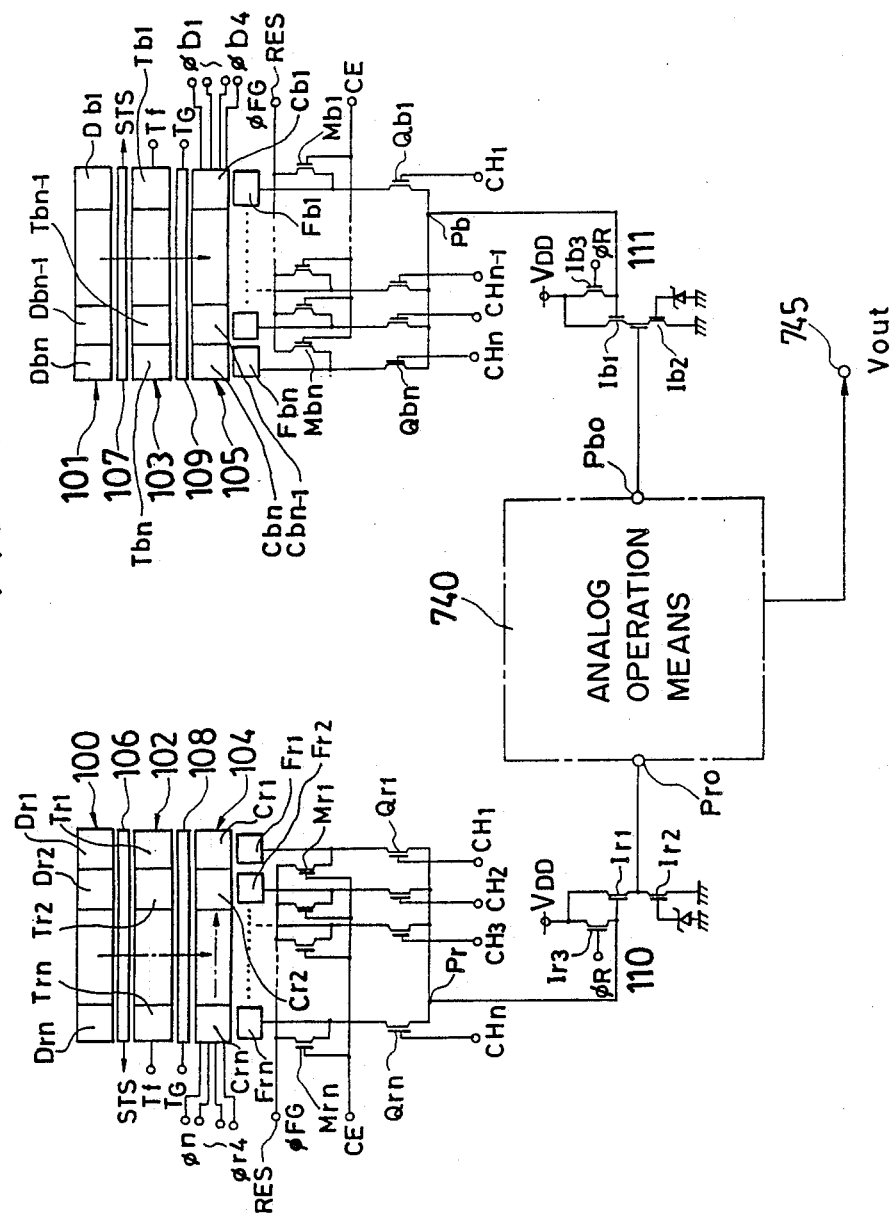
FIG. 3 is a circuit diagram of a concrete circuit configuration of the embodiment shown in FIG. 2.
Figure 3:
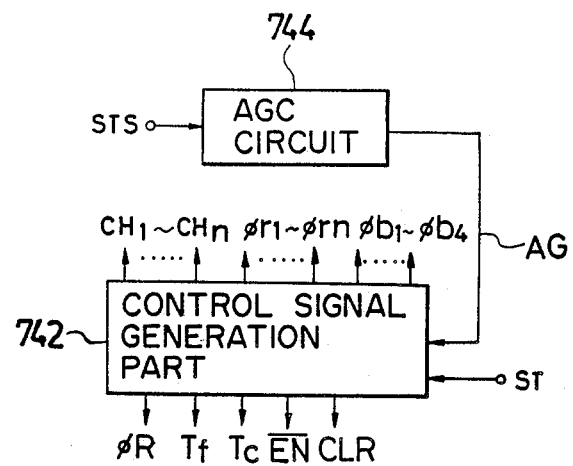

Referring now to FIG. 3, there is shown a concrete circuit which is arranged in accordance with the block diagram shown in FIG. 2. Describing the circuit in connection with the respective blocks in FIG. 2, the reference and standard image sensors 320 and 321 are constructed substantially in the same manner. That is, they are respectively composed of light receiving part 100 and 101 respectively having photoelectric conversion elements $Dr1 \sim Drn$ and $Db1 \sim Dbn$ which form the pixels of the respectively image sensors, storage parts 102 and 103 which are respectively formed of CCDs and are used to store, for every pixel, signal charges generated in the respective light receiving parts 100 and 101 thereof, and shift register parts 104 and 105 which are respectively formed of CCDs and are adapted to take in the signal charges that are transferred form the respective storage parts 102 and 103 and to transfer these signal charges in a horizontal direction.

In other words the storage parts 102, 103 and shift register parts 104, 105 include electric charge transfer elements $Tr1 \sim Trn$, $Tb1 \sim Tbn$, $Cr1 \sim Crn$, $Cb1 \sim Cbn$ which correspond to the photoelectric conversion elements $Dr1 \sim Drn$, $Db1 \sim Dbn$, respectively. The storage parts 102 and 103 transfer the signal charges in parallel to the shift register parts 104 and 105 and the shift register part 104 transfer these signal charges n the horizontal direction. As will be discussed later, unlike the shift register part 104, the shift register part 105 that is provided on the side of the standard image sensor is arranged such that it does not transfer the signal charges in the horizontal direction.

Numerals 106 and 107 respectively designate electric conductor layers which are formed on the surfaces of channel parts for moving the signal charges from the light receiving parts 100 and 101 to the storage parts 102 and 103. These electric conductor layers are respectively formed of polysilicone layers and provide potential barrier parts.

Numerals 108 and 109 respectively stand for transfer gates which are used to control the movements of the signal charges.

In addition, adjacent to the respective electric charge transfer elements Cr1 ~ Crn and Cb1 ~ Cbn, there are provided floating gates Fr1 ~ Frn and Fb1 ~ Fbn. The floating gates Fr1 ~ Frn and Fb1 ~ Fbn are respectively connected to a reset terminal RES by means of MOS types of FETs Mr1 ~ Mrn and Mb1 ~ Mbn to which gates is supplied a control signal CE and are also connected to common contacts Pr and Pb by means of MOS types of FETs Qr1 ~ Qrn and Qb1 ~ Qbn which respectively perform a multiplex operation when channel switching signal CH1 ~ CHn are applied to the gates thereof. The common contacts Pr and Pb are respectively connected to contacts Pr0 and Pb0 by means of impedance change circuits 110 and 111.

The impedance change circuits 110 and 111 have the same circuit configurations. That is, the circuits 110 and 111 respectively include MOS-type FETs Ir1, Ir2 and Ib1, Ib2 which connect a drain source path in series between a power source VDD and an earth terminal, and MOS-type FETs Ir3 and Ib3 which are respectively connected in parallel between the gate sources of the MOS-type FETs Ir1, Ib1 and, when a refresh signal $\phi R$ is applied thereto, then respectively clamp the common contacts Pr, Pb the power source VDD, with the gates of the MOS-type FETs Ir2 and Ib2 being biased at a given potential.

Figure 4:
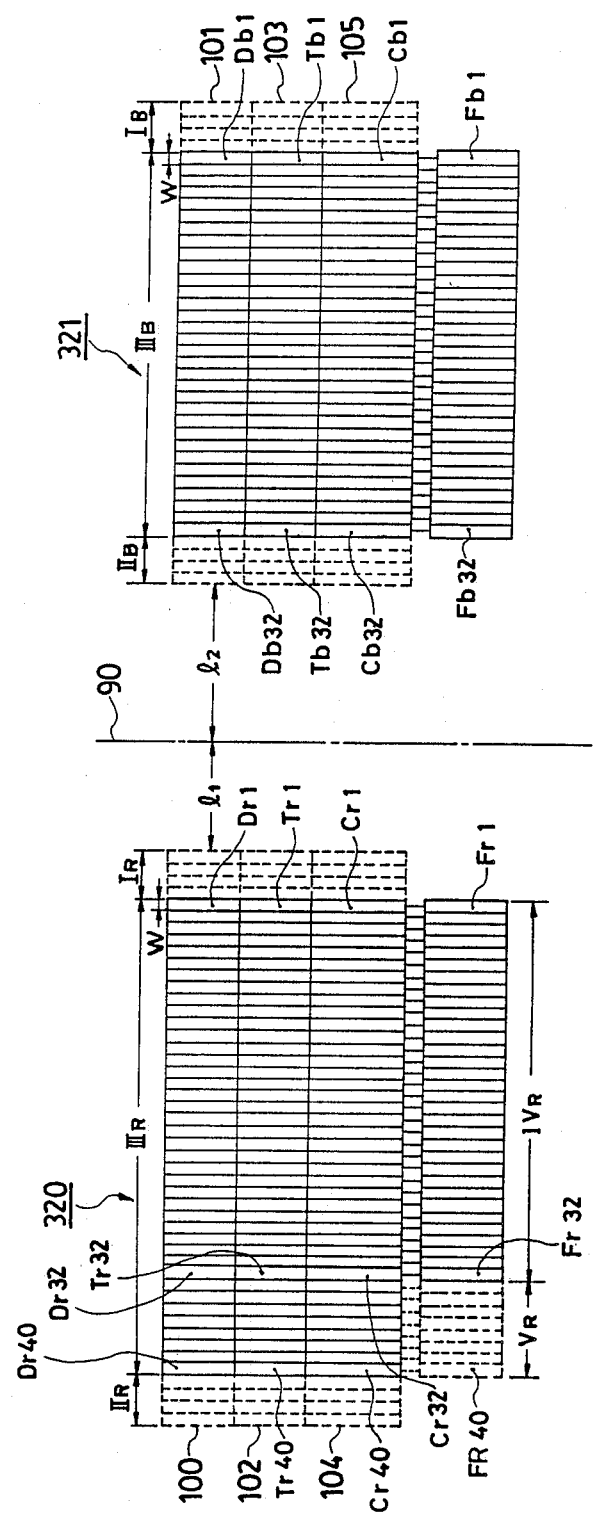
FIG. 4 is an explanatory view to show the arrangement of the light receiving parts, storage parts, shift register parts and floating rates of a reference and standard sections.

Next, description will be given below of a positional relationship between the shift register parts 104, 105 and the floating gates Fr1 ~ Frn, Fb1 ~ Fbn with reference to FIG. 4.

The photoelectric-conversion elements and electric charge transfer elements if the light receiving part 100, storage part 102 and shift register part 104 on the side of the reference image sensor 320 are respectively arranged 48 in number with an equal pitch width W. There are placed floating gates Fr1 ~ Fr40 side by side with the electric charge transfer elements Cr1 ~ Cr32 belonging to a third block IIIR and consisting of 40 electric charge transfer elements, exclusive of first and second blocks IR and IIR respectively arranged on both sides of the image sensor 32 and each consisting of four electric charge transfer elements. The 40 floating gates are further divided into a fourth block consisting of 32 floating gates Fr1 ~ Fr32 and a fifth block VR consisting of 8 remaining floating gates FR33 ~ Fr40. And, one end of the floating gates Fr1 ~ Fr40 is connected to a reset terminal RES through the MOS-type FETs Mr1, Mr2, ... shown in FIG. 3, and the floating gates Fr1 ~ Fr32 out of the floating gates are connected to the contact Pr through the MOS-type FETs Qr1 ~ Qrn shown in FIG. 3. In other words, in FIG. 3, the third and fourth blocks IIIR and IVR in FIG. 4 are shown as the representatives of all floating gates, and the description of the other blocks IR, IIR and VR is omitted. However, the blocks IR, IIR and VR are reserve areas which can be operated when the signal charges are to be transferred in the horizontal direction.

On the other hand, the photoelectric conversion elements and electric charge transfer elements in the light receiving part 101, storage part 103 and shift register part 105 on the side of the standard image sensor 321 are respectively arranged 40 in number with an equal pitch width (which is equal to the pitch of the side of the reference image sensor 320). There are arranged floating gates Fb1 ~ Fb32 respectively side by side with the electric charge transfer elements Cb1 ~ Cb32 belonging to a third block IIIB, exclusive of first and second blocks IB and IIB each consisting of the left-most and right-most four electric charge transfer elements. And, the first ends of the floating gates Fb1 ~ Fb32 are respectively connected to the MOS-type FETs Mb1 ~ Mbn, Qb1 ~ Qbn showing FIG. 3. That is, in FIG. 3, there is illustrated the third block IIIB that is shown in FIG. 4.

Also, the light receiving part 100 is arranged such that it is spaced by a distance l1 apart from an optical axis 90, while the light receiving part 101 is arranged such that it is spaced apart from the optical axis 90 by a distance l2 which can be obtained by adding four pitch widths 4W to the distance l1 (that is =l1=4·W).

Next, the phase difference detection device employed in the present embodiment is constructed in the form of one chip as a semiconductor integrated circuit device and the structure thereof will be described below with reference to a general section view in FIG. 5 which illustrates the image sensor 100 (101) to the floating gates Fr1 ~ Frn (Fb1 ~ Fbn).

Figure 5:
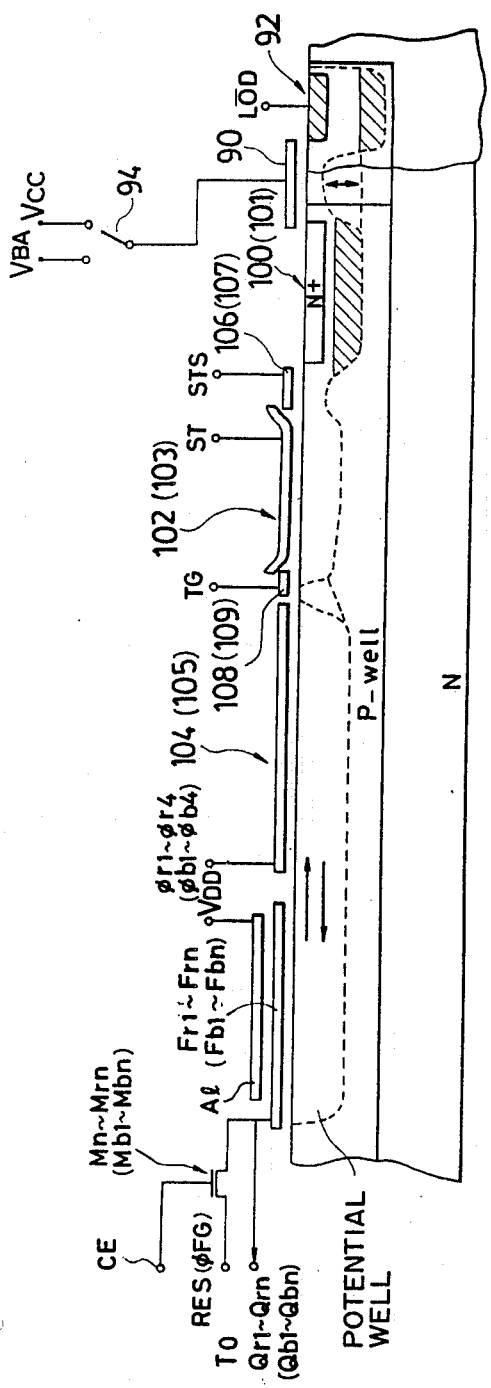
FIG. 5 is a longitudinal section view to generally show the sections of the main portions of the light receiving part, storage part, shift register part and floating gate.

In FIG. 5, the photoelectric conversion elements group of the light receiving part 100 (101) is constructed by arranging a plurality of N+-type layers in a portion of a P-type expansion layer (P-well) formed in the surface of a N-type semiconductor substrate. Also, on the semiconductor substrate, by means of a SiO$_2$ layer (not shown), there are arranged the barrier part 106 (107) which is adapted to generate a signal STS, a transfer gate electrode layer which forms the respective electric charge transfer elements of the storage part 102 (103), a gate electrode layer forming the transfer gate 108 (109), and a transfer gate electrode layer forming the respective electric charge transfer elements of the shift register part 104 (105). Also, adjacent to the shift registers 104 and 105, there are piled a poly-silicone layer which forms the floating gates Fr1 ~ Frn and Fb1 ~ Fbn, and an electrode layer Al which is to be clamped to a power source VDD. The electrode layer Al is arranged such that it can cover to whole upper surfaces of the plurality of floating gates Fr1 ~ Frn and Fb1 ~ Fbn. And, to the first ends of the respective floating gates there are connected the MOS-type FETs Mr1 ~ Mrn and Mb1 ~ Mbn.

Further, adjacent to the light receiving part 100 (101) that is arranged on the surface portion of the semiconductor substrate, there is provided a lateral overflow gate (LOG) 90 by means of the SiO$_2$ layer (not shown), and adjacent to the lateral overflow gate 90 there is provided a lateral overflow drain (LOD) 92 on the surface portion of the semiconductor substrate.

A power supply voltage Vcc or a voltage VBA (VBA < Vcc) can be supplied to the overflow gate 90 by means of a switch 94 which can be switched manually or automatically.

Figure 6:
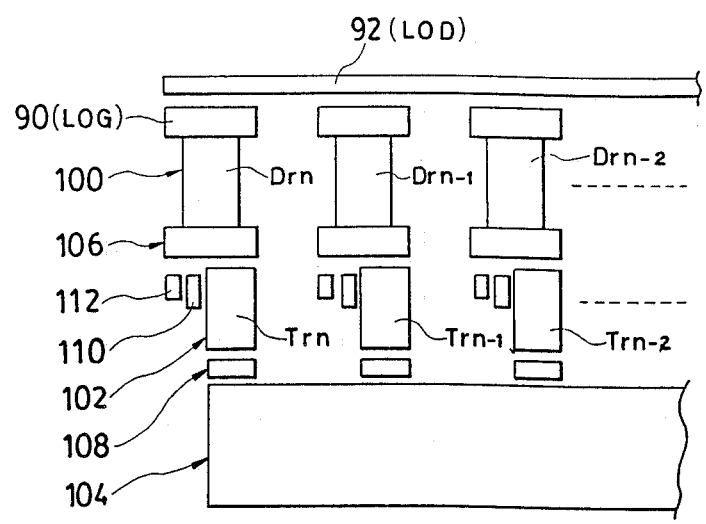
FIG. 6. is an enlarged plan view of the main portions of the light receiving part, storage part, and shift register part.

Also, although not shown in FIG. 5, in each of the reference and standard image sensors 320 and 321, in addition to the above-mentioned transfer gate 108 (109) and lateral overflow gate 90, there is provided a clear gate which is used to discharge the signal electric charges that are stored in the storage part 102 (103). These gate groups are arranged as shown in FIG. 6. In FIG. 6, there is shown the arrangement only for the reference image sensor 320, but the gate groups are arranged in the same manner for the standard image sensor 321 as well.

In FIG. 6, as shown in FIG. 5, there are arranged the lateral overflow gates 90 in such a manner that they are disposed adjacent to and correspond to the photoelectric conversion element groups Drn, Drn—1, ... which form the light receiving part 100, respectively. And, adjacent to the lateral overflow gates 90, there is arranged the overflow drain 92.

Also, adjacent to the respective electric charge transfer elements in the electric charge transfer element groups forming the storage part 102, there are arranged clear gates 110 which are used to discharge the signal charges that are stored in the electric charge transfer elements and, adjacent to the clear gates 110, there are arranged drains 112 to which the signal electric charges are discharged through the clear gates 110.

Now, while a reset signal $\phi FG$ to be applied to the reset terminal RES is set to have the same potential with the power source VDD, if the floating gates Fr1 $\sim$ Frn and Fb1 $\sim$ Fbn are clamped to the power source VDD through the MOS-type FETs Mr1 $\sim$ Mrn and Mb1 $\sim$ Mbn by a control signal of an "H" level and after then the MOS-type FETs Mr1 $\sim$ Mrn and Mb1 $\sim$ Mbn are cut off, then as shown by a dotted line in FIG. 5, a deep potential well is formed in the semiconductor substrate and the signal electric charges of the register part 104 (105) are allowed to flow into areas disposed below the floating gates. As a result of this, the voltage drops that respectively correspond to the amount of the signal electric charges which have flown occur in he respective floating gates Fr1 $\sim$ Frn (Fb1 $\sim$ Fbn) and thus the formed patterns occurring on the light receiving part 100 (101) can be detected as the voltage signals.

Also, while the reset terminal RES is set to have the same potential with the earth potential, if the floating gates Fr1 $\sim$ Frn and Fb1 $\sim$ Fbn are respectively set at "L" levels by turning on the MOS-type FETs Mr1 $\sim$ Mrn and Mb1 $\sim$ Mbn, then a shallow potential well is formed in the areas below the floating gates, with the result that the signal electric charges can be returned back to the shift register part 104 (105). Due to the fact that the above-mentioned movements of the signal electric charges are carried out in a non-destructive manner, the readouts of the signal electric charges can be repeated any number of times.

On the other hand, the unnecessary signal electric charges among the signal electric charges that have been produced by means of the photoelectric conversion by the light receiving part 100 (101) can be discharged out to the lateral overflow drain (LOD) area 92 by clamping the lateral overflow gate 90 to the power supply voltage Vcc ($>$VBA).

Also, in order to prevent the unnecessary signal electric charges among the signal electric charges generated in the light receiving part 100 (101) from being transferred to the shift register part 104 (105) which is the readout part of the signal electric charges, besides the above-mentioned manner in which the unnecessary electric charges are discharged to the overflow drain 92 through the overflow gate 90, the clear gates (CLG) 110 may be opened to thereby discharge to the drain 112 the signal electric charges that are stored in the respective electric charge transfer elements in the storage part 102 (103) corresponding to the photoelectric conversion elements in the light receiving part 100 (101).

Further, by closing the gate of the transfer gate 108 (109), the signal electric charges that are stored in the electric charge transfer elements of the storage part 102 (103) respectively corresponding to the photoelectric conversion elements of the light receiving part 100 can be prevented from flowing into the shift register part 104 (105).

In these cases, in order to open the clear gate (CLG) 110, a voltage signal of an "H" level is supplied to the clear gate (CLG) 110, while, to close the transfer gate, a voltage signal of an "L" level is supplied to the transfer gate. These voltage signals are supplied by means of switching means or the like which can be operated manually or automatically. Therefore, in order [hat only the signal electric charges of the photoelectric conversion elements belonging to a specific range among the plurality of photoelectric conversion element groups forming the light receiving part 100 are allowed to flow into the areas below the floating gates Fr1 $\sim$ Frn (Fb1 $\sim$ Fbn) and they can be detected in the form of the voltage signals, as described above, the signal electric charges that are generated in the photoelectric conversion elements belonging to the other ranges than the above-mentioned specific range may be discharged to the lateral overflow drain area 92, or the signal electric charges that are stored in the electric charge transfer elements of the storage part 102 (103) respectively corresponding to the photoelectric conversion elements that belong to the other ranges than the above-mentioned specific range may be discharged to the drain 112, or the transfer gate 108 (109) may be closed to thereby prevent the signal electric charges stored in the respective electric charge transfer elements of the above-mentioned storage part 102 (103) from flowing into the shift register part 104 (105).

As can be understood from the foregoing description, according to the invention, due to the fact that several kinds of the distance measurement ranges can be set, by operating the sensor means 32, the distance measurement range with respect to the object to be photographed can be changed in a camera and other similar optical instruments.

In other words, according to the invention, the signals that are generated by means of the floating gates Fr1 $\sim$ Frn and Fb1 $\sim$ Fbn are respectively converted to the time-series signals R(K) and B(K) by means of the multiplex operations of the MOS-type FETs Qr1 $\sim$ Qrn and Qb1 $\sim$ Qbn, and the time-series signals R(K) and B(K) are then output to the terminals Pr0 and Pb0 of an analog operation part 740, respectively.

A control signal generation part 742 is a part which is adapted to output at given timings signals CH1 $\sim$ CHn for switching channels of a given cycle, the transfer clock signals Tf of the storage parts 102 and 103 the gate signals TG of the transfer ates 108 and 109, the transfer clock signals $\phi$r1 $\sim$ $\phi$r4, $\phi$b1 $\sim$ $\phi$b4 of the shift register parts 104 and 105, an enable signal EN, a clear signal CLR, and control signals CE, $\phi$SH, $\phi$SH.

Figure 7:
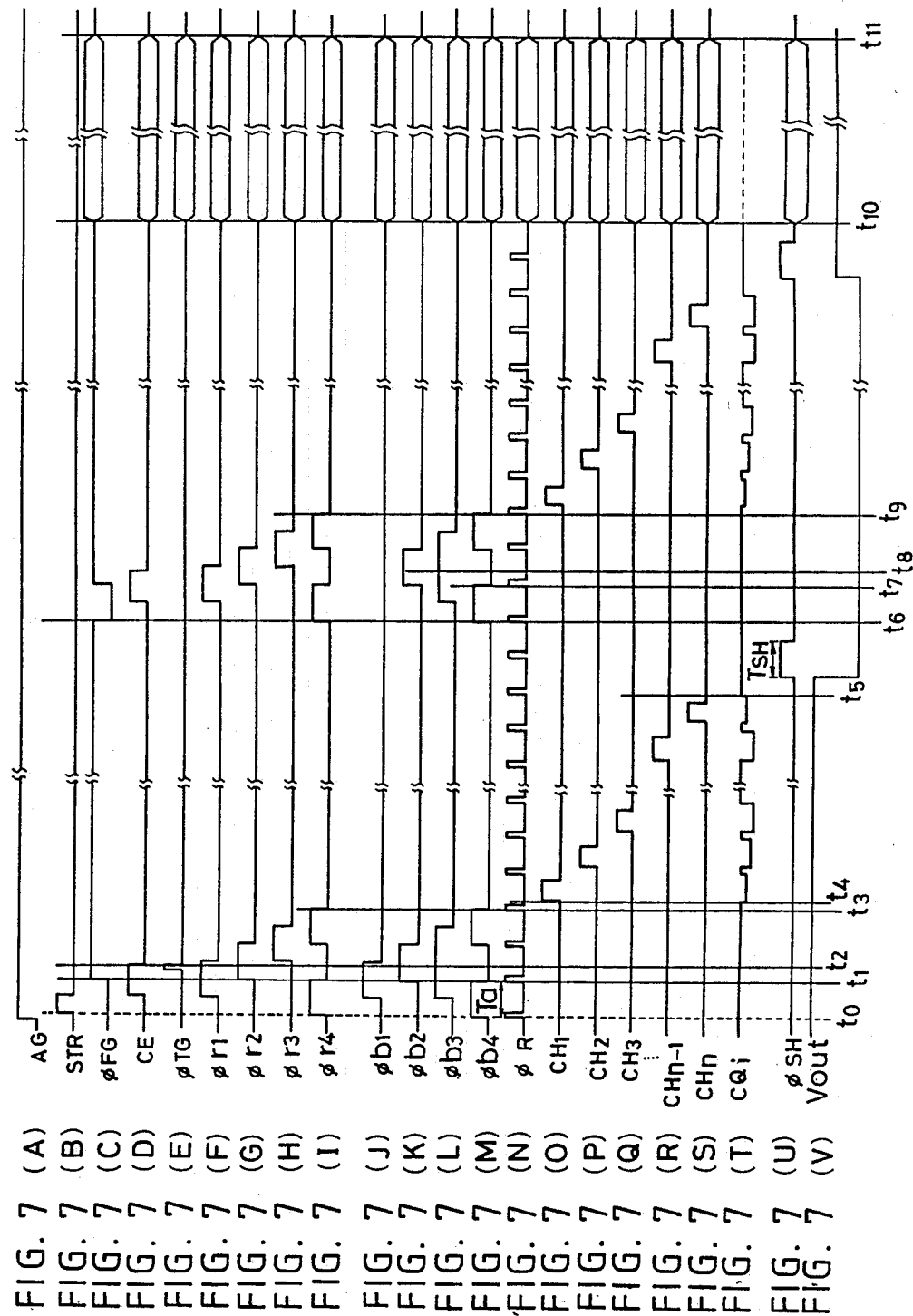
FIG. 7 is a timing chart to explain the operation of the circuit shown in FIG. 3.

Next, description will be given below of the operation of the phase difference detection by the phase difference detection device shown in FIGS. 2 and 3 in connection with a timing chart shown in FIG. 7.

If, prior to a time t0, if it is detected by the AGC circuit 744 that the photoelectric conversion elements Dr1 $\sim$ Drn, Db1 $\sim$ Dbn have generated the predetermined signal electric charges, then the AG signal goes to the "H" level, whereby an operation processing is started in synchronization with a start signal STR (which is generated in connection with a release button or the like in a camera) applied at the time t0. At first, there is generated a reset signal φR having a constant cycle Ta which is applied to the reset terminal 28. Also, during a period from the time t0 to a time t3, there are generated 4-phase clock signals φr1 ~ φr4, φb1 ~ φb4 which allow the respective electric charge transfer elements in the shift register parts 104 and 105 (see FIG. 4) to perform the electric charge transfer operations only by one pitch based on a 4-phase drive method.

At a time t1 during the above-mentioned electric charge transfer operations by the electric charge transfer elements, the control signal CE goes to the "H" level and, while the MOS-type FETs Mr1 ~ Mrn, Mb1 ~ Mbn are turning on, a reset signal φFG is inverted from the "L" level to the "H" level, so that the floating gates Fr1 ~ Fr40, Fb1 ~ Fb32 are respectively clamped to the potential of the power supply voltage VDD. And, at a time t2, the control signal CE turns to the "L" level, whereby the MOS-type FETs Mr1, Mr2, ..., Mb1, Mb2, ... respectively have a high impedance. As a result of this, the above-mentioned floating gates can be maintained in the potential as they have. Due to this, in the semiconductor substrate below the floating gates, there is formed such a potential well as shown in FIG. 5. And, since the transfer gates 108 and 109 are allowed to conduct by a gate signal φTG at a time slightly before the time t2, the signal electric charges in the storage parts 102 and 103 are moved to the corresponding electric charge transfer elements in the shift register parts 104 and 105, respectively. Then, the signal electric charges are further transferred to the above-mentioned respective potential wells until the transfer operations of the electric charge transfer elements are completed at a time t4.

Next, during a period from the time t4 to a time t5, the channel switching signals CH1 ~ CH32 are output, the MOS type FETs Qr1 ~ Qrn, Qb1 ~ Qbn forming a multiplexer circuit are turned on, and the time-series signals for the respective pixels are output to the contact Pr0 and Pb0, respectively. The signal wave forms of the contacts Pr0 and Pb0 occur in the form of CQ1 shown in FIG. 7, for example. In other words, the voltages of the floating gates Fr1 ~ Frn, Fb1 ~ Fbn are lowered by the amounts that correspond to the signal electric charges for the respective pixels and thus, in the contacts Pr0 and Pb0, there occur the voltage waveforms that are decreased by the above-mentioned voltage lowering or drops with the power supply]voltage VDD as a reference.

Figure 8:
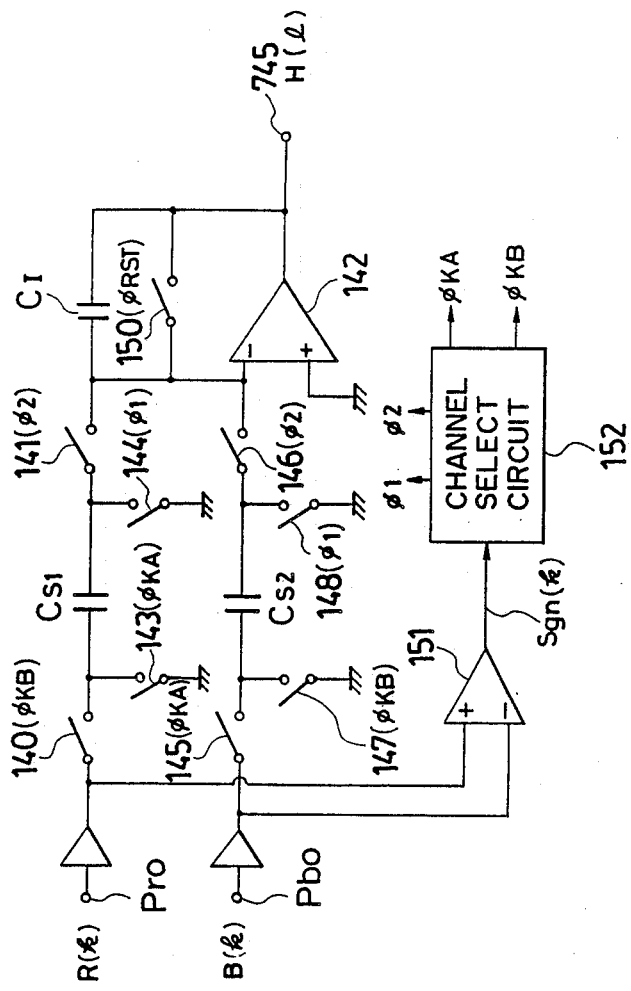
FIG. 8 is a circuit diagram to shown a concrete circuit configuration of an analog operation part in FIG. 3.

Now, description will be given below of the structure of the analog operation part 740 shown in FIG. 2 in connection with FIG. 8. The analog operation part 740 is composed of a switched capacitor integrator, in which a signal line extended from the terminal Pr0 (see FIG. 3) is connected to the inverted input terminal of a differential integrator 142 by means of a switching terminal 140, a capacity element Cs1 and a switching element 141 which are connected in series with one another, and also the two terminals of the capacity elements Cs1 are respectively connected to ground terminals by means of switching elements 143 and 144.

On the other hand, a signal line which is extended from the terminal Pb0 (see FIG. 3) is connected to the inverted input terminal of a differential integrator 142 by means of a switching element 145 a capacity element Cs2 and a switching element 146 which are connected in series with one another, and also the two terminals of the capacity element Cs2 are respectively connected to ground terminals by means of switching elements 147 and 148. Between the inverted input terminal of the differential integrator 142 and an output terminal 149, there are connected a switching element 150 and a capacity element $C_I$ which are connected in parallel with each other.

Also, to the above-mentioned two signal lines extended from the terminals Pr0 and Pb0, there are connected the inverted and non-inverted input terminals of an analog comparator 151 and the output terminal of the analog comparator 151 is connected to the input terminal of a channel select circuit 152. And, the channel select circuit 152 generates select signals φ1, φ2, φKA, and φKB which are respectively used to turn on or off the switching elements 140, 141, 143, 144, 145, 146, 147 and 148.

The above-mentioned analog comparator 151 is adapted to output a polarity signal sign (k) of the "H" level when the level of operand signals that is, signals R(k), B(k) to be operated in the analog operation part 740 is R(k) ≧ B(k) and a polarity signal S n(k) of the "L" level for R(k) < B(k). And, the voltage levels of the select signals φ1, φ2, φKA and φKB can be determined according to the level of the polarity signal sign (k).

Next, description will be given below of the operation of the analog operation part 740 constructed in the above-mentioned manner, in connection with a timing chart shown in FIG. 9.

Figure 9:
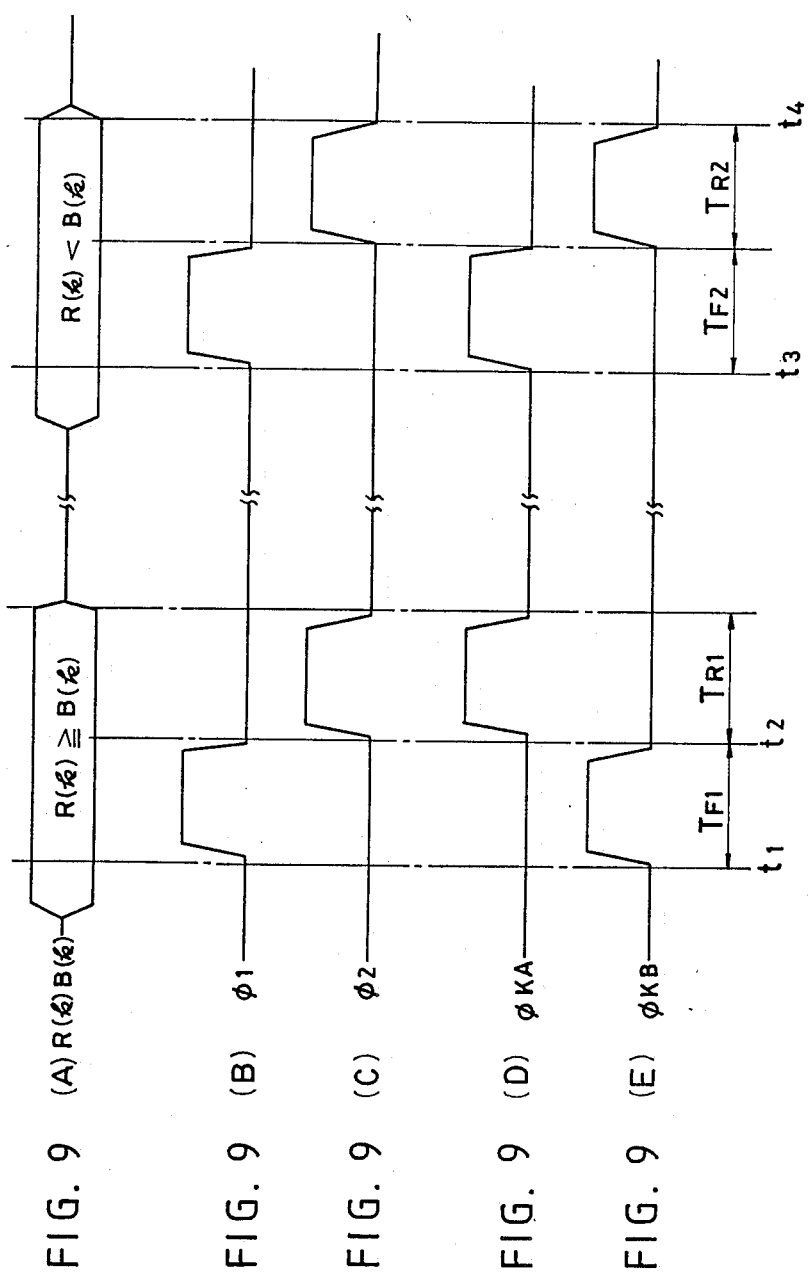
FIG. 9 is a timing chart to show the operation of the analog operation part
Figure 10:
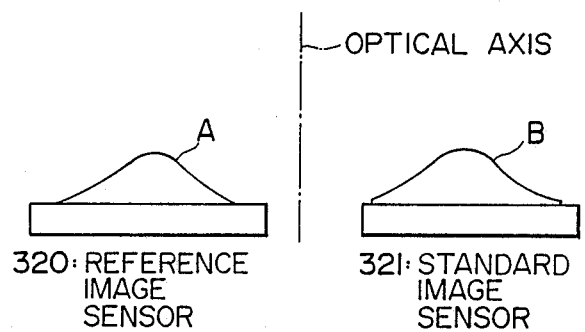
FIG. 10 is an explanatory view to explain the operation process as to/a correlation operation value.

At first, after the switching element 150 is turned on by a rest signal $φ_{RST}$, which is output from reset means (not shown), to thereby discharge the unnecessary electric charges of the capacity element $C_I$, the switching element 150 is again turned off, whereby an operation shown in FIG. 9 can be started.

That is, two kinds of operand signals R(k) and B(k) are output at a given cycle as shown in FIG. 9(A) respectively from the reference readout part 322 standard readout part 323 in the sensor means 32. When the relationship between the two operand signals is R(k) ≧ B(k) as in a period from the time t1 to the time t2, then the polarity signal Sgn(K) goes to the "H" level, so that there are generated square-waveform select signals φ1, φ2, φKA and φKB as shown in FIGS. 9(B), (C), (D), and (E). Here, these select signal φ1, φ2, φKA and φKB are generated a timing which prevents these select signals from becoming the "H" level at the same time with one another.

On the other hand, when the relationship between the two operand signals is R(k) < B(k) as in a period from the time 3 to the time t4, then the level of the polarity signal Sgn(k) becomes the "L", so that there are generated select signals which are opposite in phase to the select signals in the period from the time t1 to the time t2. It should be noted here that the select signals φ1 and φ2 are generated at the same timing regardless of the levels of the polarity signal Sgn(k).

During a former half sub-period $T_{F1}$ of the period from the time t1 to the time t2, the switching elements 144 148 as well as the switching elements 140, 147 are respectively turned on by the above-mentioned select signals φ1, φ2, φKA and φKB, the operand signal R(k) is charged into the capacity element Cs1, and the unnecessary electric charges of the Cs2 are discharged. Next, during a latter half sub-period TR1 thereof, the switching elements 143 and 141 are turned on so that the electric charges of the capacity element Cs1 can be coupled to the those of the capacity element Cs2. At the same time, the switching elements 145 and 146 are turned on and the switching elements 147 and 148 are turned off, so that the operand signal B(k) can be supplied through the capacity element Cs2 to the differential integrator 142. As a result of this, an electric charge q(k), which is shown in the following equation (2), can be stored in the capacity element $C_I$.

$$q(k) = \frac{C_I}{Cs1} \cdot R(k) - \frac{C_I}{Cs2} \cdot B(k) \quad (2)$$

On the other hand, when the relationship between the operand signals in R(k) < B(k) as in the period from the time t3 to the time t4, during a former half section $T_{F2}$ of the period from the time t3 to the time t4, the switching elements 144, 148 as well as 143, 145 are turned on, so that the operand signal B(k) can be charged into the capacity element Cs2 and the unnecessary electric charges of the capacity element Cs1 can be discharged therefrom. Next, during a latter half section TR2 of the period ranging from the time t3 to the time t4, the switching elements 147, 146 are turned on so that the electric charges of the capacity element Cs2 can be coupled to those of the capacity element $C_I$, and, at the same time, the switching elements 140, 141 are turned on and the switching elements 143, 144 are turned off, so that the operand signal R(k) can be supplied through the capacity element $C_I$ to the differential integrator 142. As a result of this, an electric charge q(k), which is shown in the following equation (3), can be stored in the capacitor element $C_I$.

$$q(k) = \frac{C_I}{Cs2} \cdot B(k) - \frac{C_I}{Cs1} \cdot R(k) \quad (3)$$

As can be understood clearly from the above-mentioned two equations (2) and (3), the analog operation part 740 is adapted to always store in the capacity element $C_I$ the electric charge that corresponds to the value obtained by subtracting an operated signal having a small level from an operand signal having a large level. For this reason, if processings are performed repetitively on the time-series operand signals R(1), ... R(n), B(1), .. B(n), then an absolute value H of a difference between these signals can be obtained as a voltage in the output terminal 745, as shown in the following equation (4).

$$H = \sum_{k=1}^{n} \left| \frac{C_I}{Cs2} \cdot B(k) - \frac{C_I}{Cs1} \cdot R(k) \right| \quad (4)$$

When the operation of the above equation is completed, then the reference readout part 322 transfers the signal charges, which are held in the shift register part 105 of the reference image sensor 320, by one pitch with respect to the signal electric charges of the other shift register part 105, and, after then, reads out these mutually out-of-phase signals electric charges in a time series manner, whereby the analog operation part 740 can process the operation of the above-mentioned equation (4). Then, the phases of the signal electric charges of the shift register parts 104 and 105 are further shifted with respect to each other and the above-mentioned operation processing is performed repetitively. The amount of such phase shifting corresponds to the above-mentioned amount l of relative movements and a correlation operation value, when the amount l of relative movements is sequentially varies, can be obtained according to the following equation (5) and can be detected as a voltage from the output terminal 745.

$$H(l) = \sum_{k=1}^{n} \left| \frac{C_I}{Cs2} \cdot B(k) - \frac{C_I}{Cs1} \cdot R(k+l-1) \right| \quad (5)$$

In other words, the equation (5) corresponds to the before-described equation (1) and the correlation operation values H(1), H(2), ... — H(l) can be obtained by means of an analog signal processing.

Next, during a period ranging from a time t10 to a time t11, the same processings as those in a previous period from a time t6 to the time t10 are performed repeatedly by a given number of times, thereby obtaining the correlation operation values that represent the relationship between the patterns to be sequentially shifted in the shift register part 104 and the patterns in the shift register part 10 which are not shifted.

Now, if l is used to represent the number of the shift operations, the correlation operation values in the above-mentioned processings can be expressed by the following equation $$H(l) = \sum_{i=1}^{n} |B(i) - R(i+l-1)| \quad (6)$$

and the thus obtained correlation operation values correspond to the before-mentioned correlation operation values obtained by means of the digital signal processings in the prior art automatic focusing adjusting device (see Equation (1)).

Figure 11A:
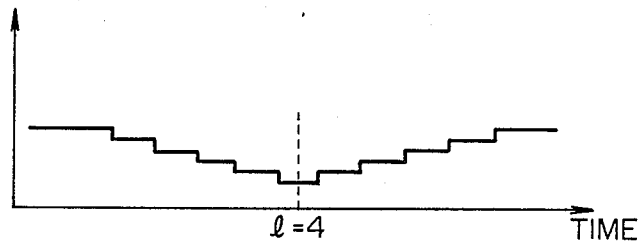
FIG. 11a, b, c are an explanatory view to illustrate the principles applied to check for a focused state according to the correlation value.
Figure 11B:
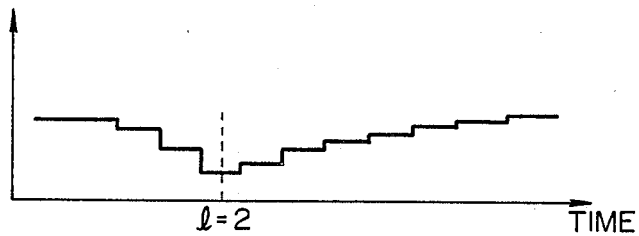
Figure 11C:
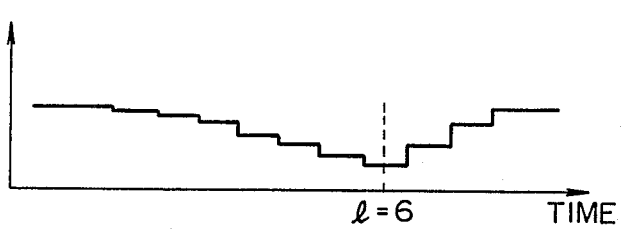

Now, referring to FIGS. 11(a) ~ (c), there are shown the examples of the waveforms of a signal Vout which is obtained from the output terminal 745 when the shift operations are performed 8 times. In particular, as shown in FIG. 11(a), if there occurs a pattern having a value which will be the smallest when l= 4, then it can be recognized that the image pickup optical system is in the focused state. Also, as shown in FIG. 11(b), if the correlation operation value obtained when l< 4 is the smallest, then the image pickup optical system can be found in the forwardly focused state and, as shown in FIG. 11(c), if the correlation operation value is the smallest when l> 4, then the image pickup optical system can be found in the rearwardly focused state. That is, the states of focusing and the amount of shifting can be detected at the same time from the values of l.

As has been described heretofore, according to the present embodiment, since the operation of the correlation operation values can be performed by means of the analog signal processings, the operation can be executed at a very high speed and also, since the circuits necessary for such operation can be packaged in one unit, the present embodiment can be manufactured ideally as a semiconductor integrated circuit device. Especially, the capacity elements in the semiconductor integral circuit device have a very high relative accuracy. That is, the very high relative accuracy of the capacity elements, in combination with the one unit packaging of the circuits, permits a high accuracy operation.

Also, due to the fact there can be provided floating gates in the respective shift register parts to thereby read out the signal electric charges in a non-destructive manner, there is eliminated the need for provision of a memory device for storing signals representing patterns relating to the image of the object tb be photographed. That is, according to the present embodiment, a small-sized phase difference detection device can be supplied.

Now, referring back again to FIG. 1, as discussed before, the correlation operation value H(l) is calculated by the analog operation part 740 in the analog operation means 74 and the thus calculated correlation operation value H(l) is then input through a sample hold circuit 76 or directly to a comparator 78. From the analog operation means 74, there are periodically output the correlation operation values H(l)(l is an integral number equal to or more than 1) in the order of H(1), H(2), However, in the non-inverted input terminal of the comparator 78 the correlation operation value that is output in the previous time from the analog operation means 74 is held by the sample hold circuit 76 which can be controlled by a timing pulse generator 80. Here, if the correlation operation value previously output from the analog operation means 74 is expressed as H(l− 1) and the correlation operation value currently output from the analog operation means 74 is expressed as H(l), then the relationship between H(l− 1) and H(l) can be compared by the comparator 78.

Then, the control circuit 86, responsive to the comparison results by the comparator 78, outputs to the motor drive circuit 68 a control signal for driving and controlling the DC motor 66 which is used as drive means for adjusting the focusing of the zoom lens 20.

Figure 12:
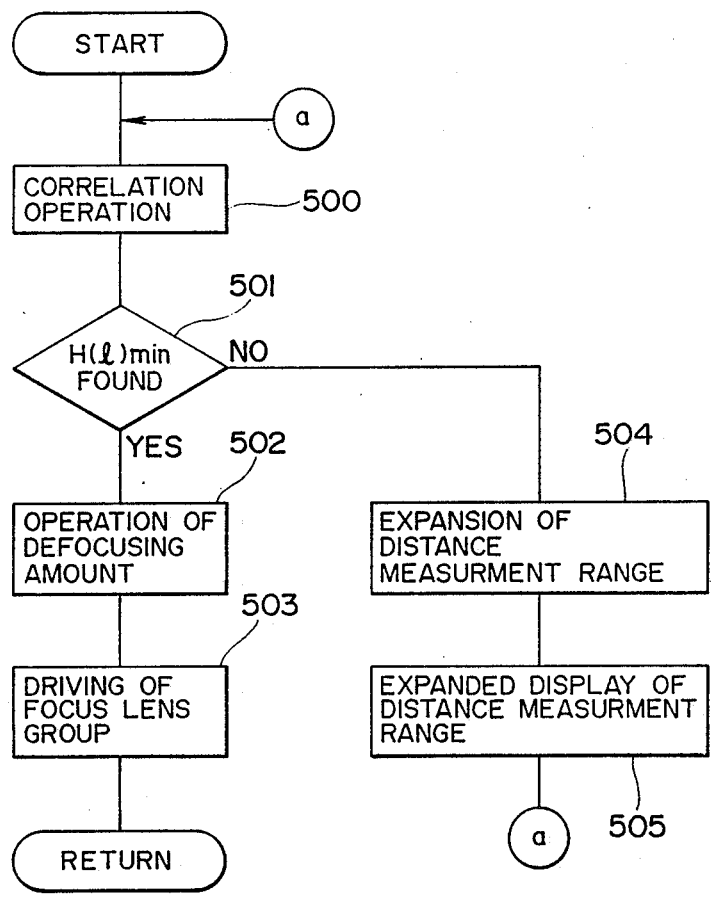
FIG. 12 is a flow chart to show the contents of an automatic for using control process program to be executed by a control circuit.

Next, referring to FIG. 12, there are shown the contents of an automatic focus control processing program to be executed by the control circuit 86. In FIG. 12, when the program is initiated, then, at first, the correlation operations are performed by the analog operation part 740 according to the pixel signals R(k) and B(k) that are respectively read out from the reference image sensor 320 and standard image sensor 321, and the correlation operation values H(l) are then output in a time-series manner from the analog operation part 740 (Step 500).

After then, the correlation operation values H(l) that are output from the analog operation part 740 are sequentially compared by the comparator 78 and, based on the output signals from the comparator 78, it is checked whether the smallest value H(l) min. in the series of the correlation operation values H(l) has been obtained or not (Step 501). If the smallest value H(l) min. has been obtained, then, based on a difference n between the value of the amount l of the relative movements when the smallest value H(l) is obtained and the value of the amount k of the relative movements when the smallest correlation operation value in the focused state is obtained, the amount of de-focusing Δd can be found according to the following equation (Step 502).

$$n = k - (l+1) \ldots \quad (7)$$

where, k=5, l=1 to 9, for example. Also, if the amount de-focusing per pixel on the image sensors 320, 321 is expressed as Δx, then the following equation is obtained:

$$\Delta d = \Delta x \cdot n \ldots \quad (8)$$

It should be noted here that in the above mentioned equation (7) k=5 in the present embodiment. Also, the sign of n represents a direction in which the focus lens group A is driven in the optical axis direction of the image pickup optical system and it also corresponds to the direction in which the DC motor is rotationally driven.

Further, there is output from the control circuit 86 to the motor drive circuit 68 a control signal for driving the DC motor 66 in such a manner that the motor 66 moves the focus lens group 20A along the optical axis thereof up to the focused position thereof according to the amount of de focusing, Δd, (Step 503).

Figure 13A:
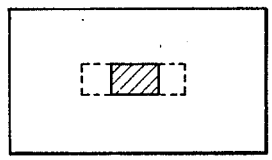
FIG. 13 is an explanatory view to illustrate the display embodiment of the distance measurement range.
Figure 13B:
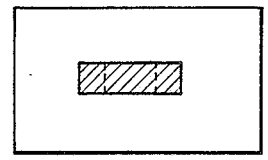

If, in Step 501, the smallest value H(l) min. in the correlation operation values sequentially output from the analog operation part 740 is not obtained, then the distance measurement ranges in the reference and standard image sensors 320 and 321, that is, the ranges in which the pixel signals R(k) and B(k) are taken out are expanded (Step 504) and at the same time in the next step 505, as shown in FIG. 13, the distance measurement range, which is normally displayed in a bar-like manner by a liquid crystal display member as shown by a shaded portion in FIG. 13(A), is expanded in an expanded manner, with the result that the processing goes back to Step 500.

Here, the expansion of the distance measurement range to be executed in Step 504 carried out, for example, in the following manner. That is, if the numbers of the pixels in the reference and standard image sensors 320 and 321 are N+2k and N, respectively, then the number of the pixels in the reference image sensor 320 that are normally used for distance measurements are set for N/2+k and the number of the pixels in the standard image sensor 321 that are normally used for distance measurements are set for N/2. And, when the distance measurement is to be expanded, the reference and standard image sensors 320 and 321 can be specified by the operation part 88 such that the total numbers of the pixels in the reference and standard image sensors can be increased up to N=2k and N, respectively.

By means of the above-mentioned processings, the focusing of the focus lens group 20A and thus the zoom lens 20 can be adjusted into the properly focused state.

Figure 14:
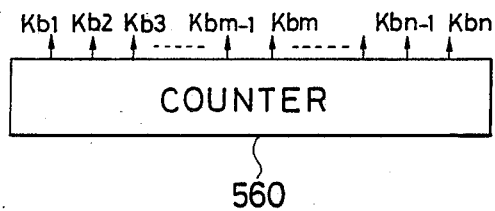
FIG. 14 is a block diagram of the structure of another embodiment of the sensor means.
Figure 14:
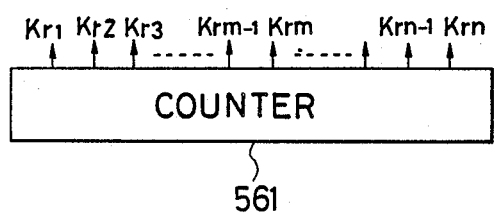
Figure 14A:
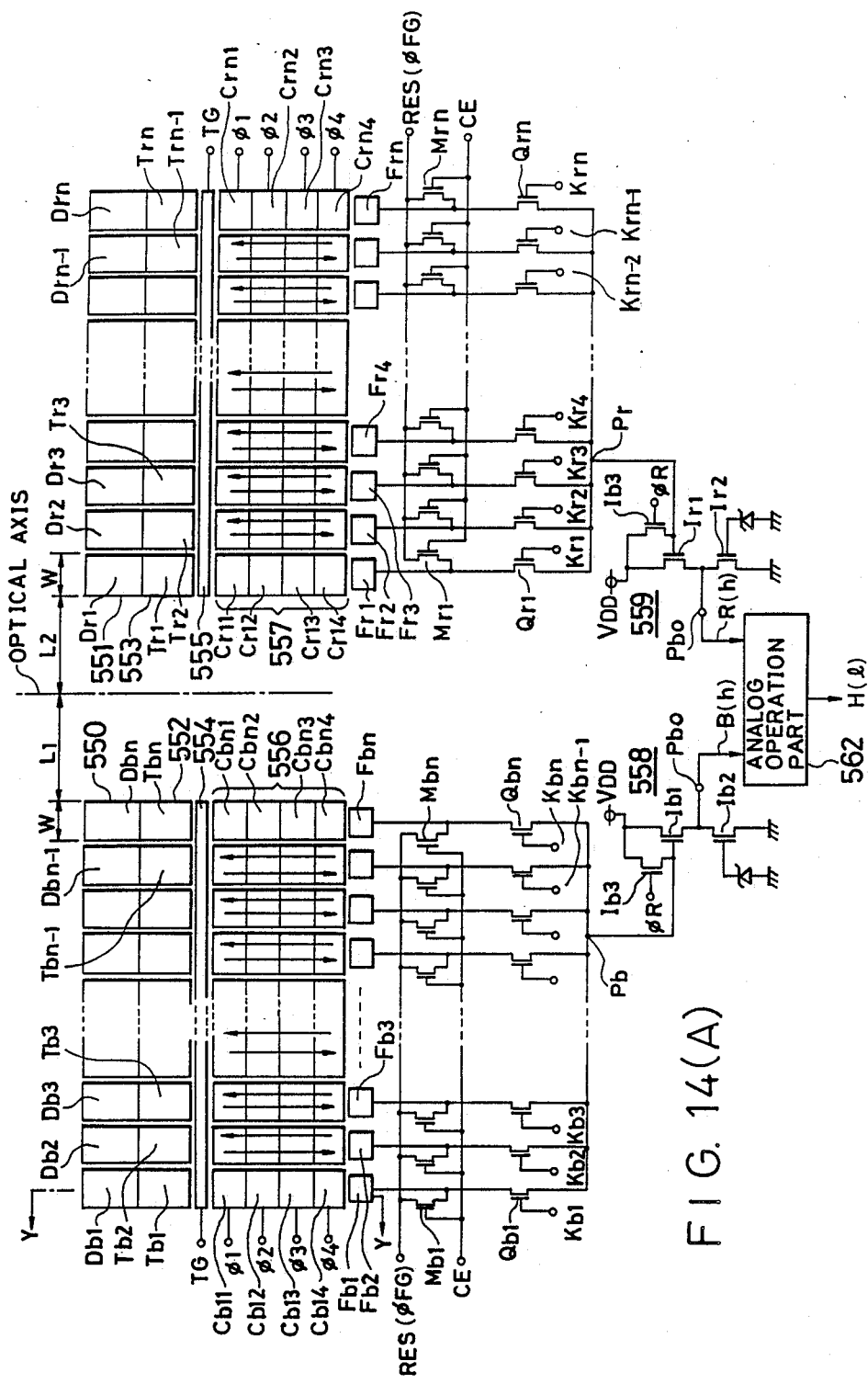
Figure 15:
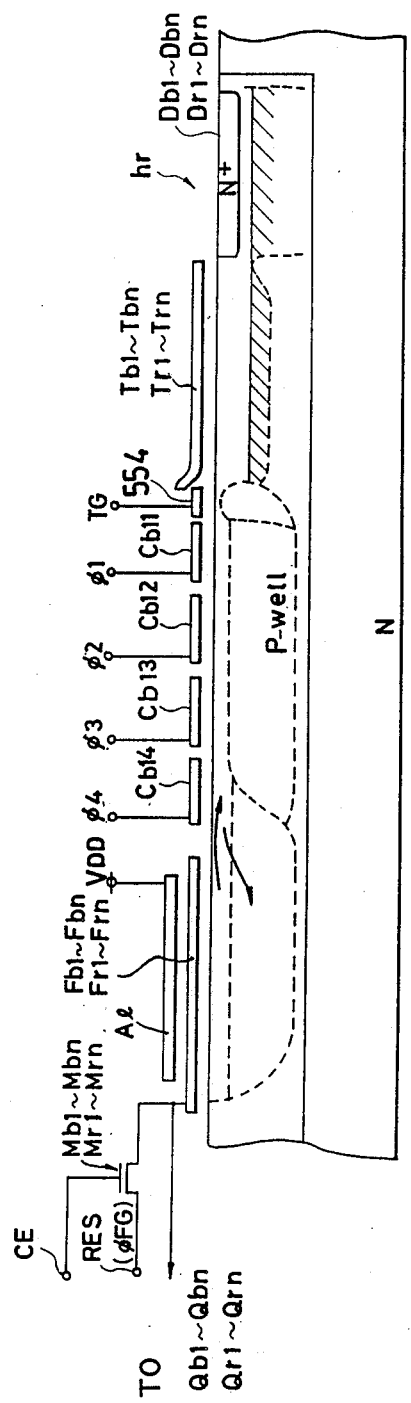
FIG. 15 is a section view of the main portions of the sensor means shown in FIG. 14.
Figure 16:
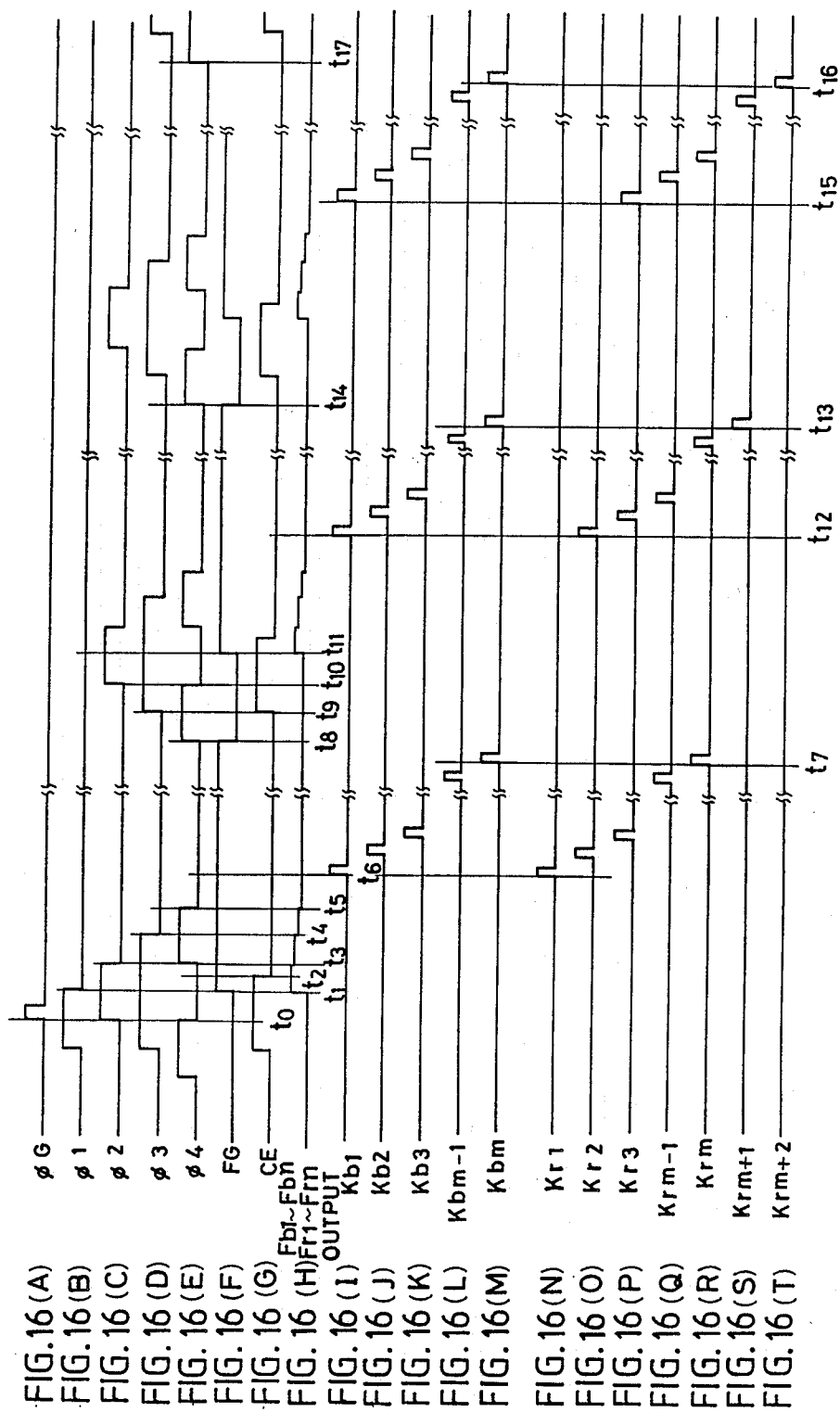

Next, another embodiment of the sensor means 32 will be discussed below with reference to FIGS. 14 to 16.

In the first embodiment of the sensor means that has been illustrated in FIG. 2 through 13, the shift register parts and other members required for shifting the operand signals are complicated in structure and thus they are not easy to control. Also, as shown in FIG. 3, due to the fact that one shift register part 104 is arranged to shift the operand signals while the other shift register part 105 is arranged not to shift the operand signals, the operations to be performed by the two shift register parts 104 and 105 are asymmetrical with respect to each other, that is, the operand signals R(k) and B(k have different effects on each other, which provides a limit to the enhancement in the matching of the their characteristics.

In view of this, the second embodiment of the invention to be described below aims at eliminating the drawbacks found in the above-mentioned first embodiment of the invention. Accordingly, the second embodiment has an object to provide a phase difference detect device which is simple in structure, easy to control, and is capable of improving the mutually matching properties if the operand signals.

The structure of the second embodiment will be at first described with reference to FIG. 14. This embodiment includes a first light receiving part 550 and a second light receiving part 551 respectively consisting of a group of photoelectric conversion elements Db1 ~ Dbn and a group of photoelectric conversion elements Dr1 ~ Drn which are used to convert photo-electrically pair of images of an object to be photographed, the paired images being formed by a separator lens (see FIG. 17) which is arranged in the optical system of the above-mentioned camera. The first and second light receiving parts 550 and 551, that is, the respective photoelectric conversion elements thereof are arranged in a line at given intervals L1 and L2 from the optical axis in a direction perpendicular to the optical axis. For example, if the pitch width of the respective photoelectric conversion elements Db1 ~ Dbn and Dr1 ~ Drn is expressed by W, then in order to shift 2N pixels, this embodiment is designed such that the interval L2 can be obtained by adding N pitch widths (N×W) to the interval L1 (that is, L2=L1+N×W). And, in this embodiment, [here are arranged N pixels respectively on the right and left sides of the pixel line. Further, with respect to the respective light receiving parts 550 and 551, there are arranged storage parts 552, 553, transfer gates 554, 555 and shift register parts 556, 557 sequentially and side by side with one another In particular, the storage 552 consists of a CCD (an electric charge transfer device) having electric charge transfer elements Tb1 ~ Tbn which respectively correspond to the photoelectric conversion elements Db1 ~ Dbn and the storage part 553 consists of a CCD having electric charge transfer elements Tr1 ~ Trn respectively corresponding to the photoelectric conversion elements Dr1 ~ Drn. The shift register part 556 consists of n sets of CCDs which are respectively adapted to advance or retreat the signal charges, for the respective electric charge transfer elements Tb1 ~ Tbn, in a vertical direction which is shown by arrows in FIG. 14. And, the shift register part 557 consists of n sets of CCDs respectively adapted to advance or retreat the signal charges, for the respective electric charge transfer elements Tr1 ~ Tbn, in a vertical direction shown by arrows in the same figure. In other words, the former n sets of CCDs are separated from the latter n sets of CCDs, so that the electric charges cannot be transferred in a horizontal direction by the CCDs. For example, when the signal electric charge that is generated in the electric charge transfer element Tb1 is transferred through a transfer gate TG to the CCD which consists of the elements Cb11 ~ Cb14, then the signal change can be reversively transferred in the vertical direction only within this CCD. The signal charges that are generated in the remaining electric charge transfer elements Tb2, Tb3, ..., Tbn are similarly transferred only by their associated CCDs. Also, similarly, in the other electric charge transfer elements Tr1 ~ Trn, there are arranged n sets of CCDs each consisting of 4 elements and the signal electric charges can be transferred only in the vertical direction which is shown by arrows in FIG. 14. It should be noted here that the transfer operation by each of the CCDs is performed at the same cycle in synchronization with drive signals $\phi 1$, $\phi 2$, $\phi 3$, and $\phi 4$, which are output based on a 4-set drive method.

Further, adjacent to the electric charge transfer elements Cb14 ~ Cbn4, Cr14 ~ Crn4 which are respectively disposed at the ends of the respective CCDs, there are provided floating gates Fb1 ~ Fbn, Fr1 ~ Frn and the floating gates Fb1 ~ Fbn, Fr1 ~ Frn are respectively connected to a reset terminal RES by means of MOS type FETs Mb1 ~ Mbn, Mr1 ~ Mrn to the gates of which a control signal CE is given. The floating gates Fb1 ~ Fbn, Fr1 ~ Frn are also connected respectively to common contacts Pb, Pr by means of MOS-type FETs Qb1 ~ Qbn, Qr1 ~ Qrn which performs multiplex operations. Then the channel switching signals Kb1 ~ Kbn, Kr1 to Krn that are output from counters 560, 561 are applied to the gate terminals of the MOS-type FETs. And, the common contacts Pb and Pr are respectively connected to terminals Pbo and Pro by means of impedance conversion circuits 558 and 559.

The above-mentioned impedance conversion circuits 558 and 559 respectively consist of the same circuit configurations with each other. In particular, they respectively include MOS-type FETs Ib1, Ib2, and Ir1, Ir2 which have drain source paths connected in series between power sources VDDs and ground terminals, and MOS-type FETs Ib3, Ir3 which are respectively connected in parallel between the gate sources of the MOS-type FETs Ib1 and Ir1 and also which clamp the common contacts Pb and Pr to the associated power sources VDDs when a refresh signal $\phi R$ is applied, with the gates of the MOS-type FETs Ib2 and Ir2 being biased at a given potential.

And, an operating on a difference between the oper- and signals B(k) and R(k) that are generated in the terminals Pbo and Pro is performed by an analog operation part 562, with the result that the correlation operation value H(l) based on the above equation (1) can be found.

The phase difference detect device illustrated in this embodiment is an IC device which is constructed as a semiconductor integrated circuit device. Next, description will be given below if the structure of the phase difference detect device that is disposed adjacent to the floating gates Fb1 ~ Fbn, Fr1 ~ Frn with reference to a schematic section view in FIG. 15. It should be noted here that FIG. 15 is a section view taken along the arrow line Y—Y and is representative of the whole structure thereof because the remaining portions thereof adjacent to the remaining floating gates have the same structure In FIG. 15, a plurality of N+-type layers are formed in a portion of a P-type expansion layer (P well) formed in the surface portion of an N-type semiconductor substrate to thereby provide the photoelectric conversion elements of the light receiving part 550 (551). Also, on the semiconductor substrate, there are arranged side by side, by means of a SiO₂ layer (not shown), a transfer gate electrode layer which forms the respective electric charge transfer elements of the storage part 552 (553), a gate electrode layer forming a transfer gate 554 (555), and a transfer gate electrode layer forming the respective electric charge transfer elements of the shift register part 556 (557). Further, adjacent to the shift register parts 556 and 557, there are arranged a polysilicone layer forming the floating gates Fb1 ~ Fbn, Fr1 ~ Frn, and an electrode layer Al to be clamped to the power source VDD. This electrode layer Al is arranged such that it covers the whole upper surfaces of the plurality of floating gates Fb1 ~ Fbn, Fr1 ~ Frn. And, to the first ends of the respective floating gates there are connected the MOS-type FETs Mb1 ~ Mbn, Mr1 ~ Mrn.

Here, a reset signal $\phi FG$ to be applied to a reset terminal RES is set to be equal to the power source VDD in potential, and at the same time the floating gates Fb1 ~ Fbn, Mr1 to Mrn are clamped to the power sources VDDs by a control signal CE of the "H" level by means of the MOS-type FETs Mb1 ~ Mbn, Mr1 ~ Mrn. After then, if the MOS-type FETs Mb1 ~ Mbn, Mr1 ~ Mrn are cut off again, then, as shown by dotted lines in FIG. 15, there is formed a deep potential well in the semiconductor substrate and the signal electric charges of the shift register part 556 (557) are allowed to flow into the areas that are present below the floating gates Fb1 to Fbn, Fr1 ~ Frn. In the respective floating gates Fb1 ~ Fbn (Fr1 ~ Frn), there occur the voltage variations that correspond to the amount of the respective signal electric charges which have flown there, and thus image formation patterns on the light receiving part 550 (551) can be detected as voltage signals.

On the other hand, if the reset terminal RES is set for the earth potential and at the same time the MOS-type FETs Mb1 ~ Mbn, Mr1 ~ Mrn are turned on to thereby cause the floating gates Fb1 ~ Fbn, Fr1 ~ Frn to go to the "L" level, then the potential well formed in the areas below the floating gates becomes shallower, so that the signal electric charges can be returned back again to the shift register part 556 (557). Such movements of the signal electric charges are performed in a non-destructive manner and, therefore, the readouts of the signal electric charges can be repeated any desired number of times.

Then, the signals that are generated in this manner by means of the floating gates Fb1 ~ Fbn, Fr1 ~ Frn are converted to time-series signals B(k) and R(k) by means of the multiplex operations of the MOS-type FETs Qb1 ~ Qbn, Qr1 ~ Qrn, and the time-series signals are then output to the respective terminals Pbo and Pro.

Next, the operation of the phase difference detect device the shift register part 556 (557). Further, adjacent to the constructed in the above-mentioned manner will be described the shift register part 556 (557). Further, adjacent to the below with reference to a timing chart shown in FIG. 16.

At first, it is assumed that, prior to a time t0, the light receiving parts 550, 551 and storage parts 552, 553 have converted the patterns of the images of the object to be photographed in a photoelectric manner. If a signal $\phi G$ goes to the "H" level at the time t0 to thereby allow the transfer gates 554, 555 to conduct for a given time, then the signal electric charges of the respective elements Tb1 ~ Tbn, Tr1 ~ Trn, during a period ranging from the time t0 to a time t1, are transferred to their associated potential wells generated in the first to third groups of transfer elements of the shift register parts 556, 557, that is, Cb11 ~ Cbn1, Cb12 ~ Cbn2 Cb13 ~ Cbn3, Cr11 ~ Crn1, Cr12 ~ Crn2, Cr13 ~ Crn3 by the drive signals $\phi 1$, $\phi 2$, $\phi 3$, which respectively go to the "H" level.

Then, if, during a period from the time t1 to a time t2, the signals $\phi FG$ and FE go to the "H" level simultaneously, then the floating gates Fb1 ~ Fbn, Fr1 ~ Frn are clamped to the power supply voltages respectively, whereby the floating gates are reset respectively. At the same time, since the signals $\phi 1$ and $\phi 4$ turn to the "L" level and the signals $\phi 2$ and 3 turn to the "H" level during a period ranging from the time t1 to a time t3, the signal electric charges can be held in the second and third groups of transfer elements Cb12 ~ Cbn2 Cb13 ~ Cbn3, Cr12 ~ Crn2, Cr13 ~ Crn3 of the shift register parts 556, 557.

Next, during a period ranging from the time t3 to a time t4, since the signals $\phi 1$ and $\phi 2$ go to the "L" level and the signals $\phi 3$ and $\phi 4$ g to the "H" level, the signal electric charges are transferred to the third and fourth groups of transfer elements Cb13 ~) Cbn3, Cb14 ~ Cbn4, Cr13 ~ Crn3, Cr14 in the shift register parts 556, 557, so that the voltage signals that correspond to the respective signal electric charges gradually begin to occur in the floating gates Fb1 ~- Fbm. Fr1 ~ Frn, respectively.

Then, during a period ranging from the time t4 to a time t5, since the signal $\phi 1$, $\phi 2$ and $\phi 3$ turn to the "L" level respectively and the signal $\phi 4$ turns to the "H" level and further, after the lapse of the time t5, the signal $\phi 4$ also turns to the "L" level, the signal electric charges that are generated in the respective elements Tb1 ~ Tbn, Tr1 ~ Trn are held in the potential wells below the associated floating gates and the voltages that correspond to the patterns of the object images are generated in the respective floating gates Fb1 ~ Fbn, Fr1 ~ Frn.

After then, during a period ranging from a time t6 to a time t7, by means of the MOS-type FETs Qb1 ~ Qbm, Qr1 ~ Qrm which are allowed to conduct and not to conduct sequentially in synchronization with square-shaped switching signals Kb1 ~ Kbm, Kr1 ~ Krm output from two counters 560, 561 respectively, the voltages that are generated in the respective floating gates Fb1 ~ Fbn, Fr1 ~ Frn are output the shift register part 556 (557). Further, adjacent to the to the common contacts Pb, Pr, and the voltages are further supplied as the time-series signals B(k), R(k) to the analog operation part 562 through the impedance conversion circuits 558, 559. In other words, the counter 560 supplies the analog operation part 562 m pieces of voltage signals out of n pieces of voltage signals (m<n) that are respectively generated in the floating gates Fb1 ~ Fbn, while the counter 561 similarly supplies the analog operation part 563 m pieces of voltage signals out of n pieces of voltage signals respectively generated in the floating gates Fr1 ~ Frn (m<n). And, the analog operation part 562 performs the difference operations based on these time-series signals B(k), R(k) and then outputs the first correlating operation value H(1). It should be noted here that the analog operation part in the first embodiment is used as the analog operation part 562.

Next, during a period ranging from a time t8 to a time t9, the signal $\phi 4$ turns to the "H" level and further, during a period ranging from the time t9 to a time t10, the signals $\phi 3$ and $\phi 4$ turn to the "H" level respectively. At the same time, the signal $\phi FG$ goes to the "L" level and the signal CE goes to the "H" level. As a result of this, the potentials of the respective floating gates Fb1 ~ Fbn, Fr1 ~ Frn are lowered and thus they are formed potential wells respectively in the third and fourth groups of transfer elements Cb13 ~ Cbn3, Cb14 ~ Cbn4, Cr13 ~ Crn3, Cr14 ~ Crn4 of the shift register parts 556 and 557. For this reason, the signal electric charges under the floating gates are returned back to their associated potential wells that are formed below the above-mentioned third and fourth groups of transfer elements.

After then, during a period ranging from the time t10 to a time t11, the signals $\phi 2$ and $\phi 3$ go to the "H" level and the signal $\phi 4$ goes to the "L" level, with the result that the signal electric charges are moved back to the respective potential wells formed below the second and third groups of transfer elements Cb12 ~ Cbn2, Cb13 ~ Cbn3, Cr12 ~ Crn2, Cr13 ~ Crn13 of the shift register parts 556 and 557, and are held there, respectively.

Next, during a period ranging from the time t11 to a time t12, the signals are controlled similarly as in the above-mentioned periods ranging from the time t1 to the time t6 and, by the time t12, the voltage signals based on the same signal electric charges are generated in the respective floating gates Fb1 ~ Fbn, Fr1 ~ Frn. During this period, due to the fact that the signal $\phi G$ and $\phi 1$ remain in the "L" level, the signal electric charges once transferred are not to be affected by the light receiving parts 550, 551 and storage parts 552, 553. That is, the two signals are left in the "L" level until a series of correlation operation value operations are completed.

Then, during a period ranging from the time t12 to a time t13, there are output from the counter 560 pulse signals or switching signals Kb1 ~ Kbm which are respectively output at the same timings with the signals output during the previous period ranging from the time t6 to the time t7. On the other hand, from the counter 561, there are output switching signals Kr2 ~ Krm + 1 which are generated in synchronization with the switching signals Kb1 ~ Kbm, respectively. However, the switching signals Kr2 ~ Krm + 1 are arranged such that m pieces of voltage signals are to be output from the floating gates Fr2 ~ Frm + 1. For this reason, in the terminal Pbo there are generated time-series signals which include B(1), B(2), ..., and B(m). On the other hand, in the terminal Pro there are generated time series signals including R(2), R(3), ..., R(m), and R(m+1) which are relatively shifted in phase by 1. And, based on the time-series signals B(k), R(k +1) (where K=1 ~ m) that are sequentially output in this manner, the analog operation part 562 finds the second correlation operation value H(2).

After then, during a period ranging from a time t14 to a time t16, the same control operations are repeated as in the previous periods ranging from the time t8 to the time t13. However, in a period from a time t15 to the time t16 in which the voltage signals are generated again in the respective floating gates Fb1 ~ Fbn, Fr1 ~ Frn, the counter 561 outputs switching signals Kr3 ~ Krm + 2 sequentially and the counter 560 outputs the switching signals Kb1 ~ Kbm as in the previous period. Therefore, in the terminal Pbo there are generated the time-series signals including B(1), B(2), ..., and B(m), while in the terminal Pro there are generated time-series signals R(3), R(4), ..., and R(m+2) which are shifted in phase further by 1[And, based on the thus generated time series signals B(k) and R(k+2), the analog operation part 562 obtains the third correlation operation value H(3).

Further, after a time t17, similar processings are performed as in the period ranging from the time t14 to the time t16 and, besides this, the switching signals output from the counter 561 are sequentially shifted in phase with respect to the switching signals output from the counter 560 before they are output, whereby the analog operation part 562 is able to produce the correlation operation value H(l) that is shown in the above-mentioned equation (1).

As described above, according to the second embodiment of the invention, the patterns of a pair of images of an object to be photographed are converted in a photoelectric manner, the signal electric charges that are obtained by means of such photoelectric conversion are read out as the voltage signals in a non-destructive manner through the floating gates, and further the readout voltage signals are converted at a given timing to the time-series signal B(k), R(k+l) (l represents a relative phase shift) which are relatively shifted in phase at a given timing before they are output, so that the phase difference can be detected at high speed and with a high accuracy by performing an analog operation based on the time-series signals B(k) and R(k+l). Also, the parts of the analog operation means necessary to generate the time-series signals B(k) and R(k+l) have such structures and operations that are highly ad table with respect to each other and, especially, the structures and operations of the shift register parts 556 and 557 are highly adjustable with respect to each other, so that the operation accuracy can be enhanced. Further, the embodiment is advantageous over the prior art devices in that it is easier to control and that it is constructed by effective use of a relative accuracy which is the most outstanding characteristic of the integrated circuit technology.

In addition, as another embodiments of the sensor means, photoelectric conversion devices of a nondestructive readout type which are respectively disclosed in Japanese laid-open Pat. Applications (Tokkai) Nos. 56-165473, No. 58-105672 and No. 60-12759 can be applied.

In the above-mentioned embodiments, although description has been given of a case in which the automatic focusing adjusting device according to the invention is applied to a camera, the invention is not limited to this, but, of course, the invention can also be applied to other optical instruments such as a distance measurement device and the like.

As has been described hereinbefore, according to one aspect of the invention, there is provided an automatic focusing adjusting device which checks whether an image pickup optical system is in a focused state or not by detecting the relative positions of a pair of optical images of an object to be photographed as the distance measurement information, and, when the image pickup optical system is not in the focused state, drives the image pickup optical system in the direction of the optical axis thereof based on the above-mentioned relative positions until the image pickup optical system gets into the focused state so as to achieve focusing, the automatic focusing adjusting device comprising: sensor means including a pair of sensors each having a light receiving part consisting of a plurality of photoelectric conversion elements arranged in a line manner, each photoelectric conversion element forming a pixel, a storage part for storing the signal charges that are generated in the light receiving part for every pixel, a readout part for reading out the signal charges that are transferred from the storage part, and charge input preventive means for preventing the signal charges that are generated in the respective photoelectric conversion elements forming the light receiving part from flowing into the readout part, the sensor means being capable of photoelectrically converting the pair of optical images by means of the pair of sensors and of outputting in a non-destructive manner the analog electric signal that is generated by the photoelectric conversion and corresponds to one of the paired optical images and the analog electric signal that is generated by the photoelectric conversion and corresponds to the other of the paired optical images while staggering the analog electric signals from each other at a given cycle for every pixel; operation means for specifying a distance measurement range in each of the light receiving parts of the sensor means; and, control means responsive to the specification by the operation means for controlling the charge input preventive means so that only the signal charges that are stored in the photoelectric conversion elements but belong to the distance measurement range unnecessary for the distance measurement information in the light receiving parts are prevented from flowing into the readout parts. Therefore, according to the present invention, The distance measurement range can be changed freely on the side of the image sensors in which the focusing can be detected, so that the loads of the software can be reduced and thus the costs of the device can also be lowered.

Also, according to another aspect of the invention, there is provided an automatic focusing adjusting device which checks whether an image pickup optical system is in a focused state or not by detecting the relative positions of a pair of optical images of an object to be photographed as the distance measurement information, and, when the image pickup optical system is not in the focused state, drives the image pickup optical system in the direction of the optical axis thereof based on the above-mentioned relative positions until the image pickup optical system gets into the focused state so as to achieve focusing, the automatic focusing adjusting device comprising: sensor means including a pair of sensors each consisting of a plurality of photoelectric conversion elements arranged in a line manner, each element forming a pixel, the sensor means being capable of detecting the relative positions of the paired optical images respectively formed on the paired sensors as the distance measurement information on the object; operation means for specifying the distance measurement range of the paired sensor; display means for visibly displaying the distance measurement ranges of the paired sensors; and, control means for changing the distance measurement ranges of the paired sensors based on the distance measurement information that is obtained from the sensor means or based on the output signal of the operation means, and for allowing the display means to display the changed versions of the distance measurement ranges. Therefore, according to the invention, when the distance measurement ranges of the line sensors are changed, the distance measurement ranges before and after changed can be displayed visibly.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An automatic focusing adjusting device capable of checking whether an image pickup optical system is in a focused state or not by detecting the relative positions of a pair of optical images of an object to be photographed as the distance measurement information, and, when the image pickup optical system is not in the focused state, driving the image pickup optical system in the direction of the optical axis thereof based on the detected relative positions until the image pickup optical system gets into the focused state so as to achieve the focusing of the image pickup optical system, said automatic focusing adjusting device comprising:

sensor means including a pair of sensors each having a light receiving part consisting of a plurality of photoelectric conversion elements arranged in a line manner, each of said photoelectric conversion elements forming a pixel, a storage part for storing the signal charges that are generated in said light receiving part for every pixel, a readout part for reading out the signal charges that are transferred from said storage part, and charge input preventive means for preventing the signal charges that are generated in said respective photoelectric conversion elements forming said light receiving part from flowing into said readout part, said sensor means being capable of photoelectrically converting said pair of object optical images by use of said pair of sensors and of outputting in a non-destructive manner an analog electric signal, which is generated by means of said photoelectric conversion and corresponds to one of said pair of optical images, and an analog electric signal, which is generated by means of said photoelectric conversion and corresponds to the other of said pair of optical images, while staggering said analog electric signals with respect to each other at a given cycle for every pixel;

operation means for specifying a distance measurement range in each of said light receiving parts of said sensor means; and, control means responsive to said specification by said operation means for controlling said charge input preventive means in such a manner that only the signal charges that are stored in said photoelectric conversion elements but belong to one or more distance measurement ranges unnecessary for said distance measurement information in said light receiving parts are prevented from flowing into said readout parts.

2. An automatic focusing adjusting device as set forth in claim 1, wherein said operation means is switch means which can be manually operated to generate a signal for specifying the distance measurement ranges in said light receiving parts in said pair of sensors.

3. An automatic focusing adjusting device as set forth in claim 2, wherein said sensor means includes an analog operation part for finding a correlation operation value H(1) according to the following equation:

$$H(l) = \sum_{K=1}^{n} |B(k) - R(k + l - 1)|$$

(K is the numbers that are given the photoelectric conversion elements of the light receiving parts respectively forming said respective sensors)

where, B(k) and R(k) respectively represent the analog electric signals that are obtained by photoelectrically converting optical images formed on said pair of sensors, and H(l) stands for the correlation operation value of said pair of images formed.

4. An automatic focusing adjusting device as set forth in claim 3, wherein said analog operation part is composed of a switched capacitor integrator.

5. An automatic focusing adjusting device as set forth in claim 4, wherein each of said charge input preventive means comprises a group of lateral overflow gates respectively arranged adjacent to said plurality of photoelectric conversion elements forming said light receiving part so as to correspond to said respective photoelectric conversion elements, and a group of lateral overflow drains arranged adjacent to said lateral overflow gates group, and also wherein said control means outputs to said sensor means a control signal for opening the lateral overflow gates that are arranged so as to correspond to the photoelectric conversion elements that belong to the other distance measurement ranges than the distance measurement ranges in said light receiving part specified by said operation means.

6. An automatic focusing adjusting device as set forth in claim 4, wherein each of said charge input preventive means comprises a group of transfer gates which are interposed between said storage part and readout part so as to correspond to said plurality of photoelectric conversion elements, and also wherein said control means outputs to said sensor means a control signal for closing the transfer gates arranged so as to correspond to the photoelectric conversion elements that belong to the other distance measurement ranges than the distance measurement ranges specified by said operation means.

7. An automatic focusing adjusting device as set forth in claim 4, wherein each of said charge input preventive means comprises a group of clear gates which are arranged adjacent to a plurality of electric charge transfer elements forming said storage part, and a group of drains arranged adjacent to said clear gates group, and wherein said control means outputs to said sensor means a control signal for opening the clear gates that are arranged adjacent to the electric charge transfer elements in said storage part respectively corresponding to the photoelectric conversion elements belonging to the other distance measurement ranges than the distance measurements ranges specified by said operation means.

8. An automatic focusing adjusting device capable of checking whether an image pickup optical system is in a focused state or not by detecting the relative positions of a pair of optical images of an object to be photographed as the distance measurement information, and, when the image pickup optical system is not in the focused state, driving the image pickup optical system in the direction of the optical axis thereof based on the detected relative positions until the image pickup optical system gets into the focuses state so as to achieve focusing of the image pickup optical system, said automatic focusing adjusting device comprising:

sensor means including a pair of sensors each consisting of a plurality of photoelectric conversion elements arranged in a line manner, each element forming a pixel, said sensor means being capable of detecting the relative positions of said pair of optical images respectively formed on said pair of sensors as the distance measurement information on said object;

operation means for specifying the distance measurement ranges of said pair of sensors;
display means for visibly displaying said distance measurement ranges of said pair of sensors; and
control means for changing said distance measurement ranges of said pair of sensors based on the distance measurement information that is obtained from said sensor means or based on the output signal of said operation means and for allowing said display means to display the changed versions of said distance measurement ranges.

9. An automatic focusing adjusting device as set forth in claim 8, wherein said operation means is switch means which can be operated manually to generate a signal for specifying the distance measurement ranges in said light receiving parts in said pair of sensors.

10. An automatic focusing adjusting device as set forth in claim 9, wherein said sensor means includes an analog operation part for finding a correlation operation value H(l) is the amount of relative movment) according to the following equation:

$$H(l) = \sum_{K=1}^{n} |B(k) - R(k + l - 1)|$$

(K is the numbers that are given the photoelectric conversion elements of the light receiving parts respectively forming said respective sensors)
where, B(k) and R(k) respectively represent the analog electric signals that are obtained by photoelectrically converting optical images formed on said pair of sensors, and H(l) stands for the correlation operation value of said pair of images formed.

11. An automatic focusing adjusting device as set forth in claim 10, wherein said analog operation part is composed of a switched capacitor integrator.

12. An automatic focusing adjusting device as set forth in claim 11, wherein said display means includes a liquid crystal display member arranged within an optical finder and displays said distance measurement ranges in a bar-like manner.

13. An automatic focusing adjusting device as set forth in claim 11, wherein said display means is an electronic view finder.

14. An automatic focusing adjusting device as set forth in claim 12 or 13, wherein, if the smallest value is not found in said correlation operation values H(l) that are output sequentially form said analog operation part, then said control means expands said distance measurement ranges on said pair of sensors and also controls said display means to display said distance measurement ranges in an expanded manner.

* * * * *